(12) United States Patent
Zhang et al.

(10) Patent No.: US 11,055,715 B2
(45) Date of Patent: Jul. 6, 2021

(54) SETTLEMENT METHOD AND APPARATUS

(71) Applicant: Advanced New Technologies Co., Ltd., Grand Cayman (KY)

(72) Inventors: Hong Zhang, Zhejiang (CN); Sihai Yao, Zhejiang (CN); Li Chen, Zhejiang (CN); Xiaobo Zhang, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/724,457

(22) Filed: Dec. 23, 2019

(65) Prior Publication Data

US 2020/0126090 A1 Apr. 23, 2020

Related U.S. Application Data

(63) Continuation of application No. PCT/CN2018/092202, filed on Jun. 21, 2018.

(30) Foreign Application Priority Data

Jun. 23, 2017 (CN) .......................... 201710485199.5

(51) Int. Cl.
*G06Q 20/40* (2012.01)
*G06K 7/10* (2006.01)
*G06K 9/00* (2006.01)
*G06Q 40/02* (2012.01)
*G07G 1/00* (2006.01)

(52) U.S. Cl.
CPC ... *G06Q 20/40145* (2013.01); *G06K 7/10366* (2013.01); *G06K 9/00288* (2013.01); *G06Q 40/02* (2013.01); *G07G 1/009* (2013.01)

(58) Field of Classification Search
CPC ............ G06Q 20/40145; G06Q 40/02; G06K 7/10366; G06K 9/00288; G07G 1/009
See application file for complete search history.

(56) References Cited

U.S. PATENT DOCUMENTS 8,191,780 B2 * 6/2012 Daily .................. G07G 1/0036
235/383
2007/0046426 A1 * 3/2007 Ishibashi ................ G07C 9/257
340/5.52

(Continued)

FOREIGN PATENT DOCUMENTS

CN 103295341 A * 9/2013
CN 104867256 A 8/2015

(Continued)

OTHER PUBLICATIONS

International Search Report in International Application No. PCT/CN2018/092202, dated Sep. 27, 2018.

*Primary Examiner* — Mohamed Barakat
(74) *Attorney, Agent, or Firm* — Finnegan, Henderson, Farabow, Garrett & Dunner, LLP

(57) ABSTRACT

A settlement apparatus includes shielding walls, a shielding door configured to, when closed, enclose an electromagnetic shielding space with the shielding walls for isolating signals inside and outside the electromagnetic shielding space, a reader configured to acquire data in an electronic tag in the electromagnetic shielding space, and a controller configured to control opening or closing of the shielding door, control the reader to acquire data, and settle according to the data.

25 Claims, 19 Drawing Sheets

(56) References Cited

U.S. PATENT DOCUMENTS

| | | | |
|---|---|---|---|
| 2009/0195358 A1* | 8/2009 | Vennelakanti | G06K 7/10336 |
| | | | 340/10.1 |
| 2010/0288837 A1* | 11/2010 | Tomiyama | G07G 1/0036 |
| | | | 235/383 |
| 2018/0160282 A1* | 6/2018 | van de Poll | H04W 4/029 |

FOREIGN PATENT DOCUMENTS

| | | | |
|---|---|---|---|
| CN | 105761388 A * | 7/2016 | |
| CN | 106204197 A | 12/2016 | |
| CN | 106447965 A * | 2/2017 | |
| JP | 2007316735 A | 12/2007 | |

* cited by examiner

SETTLEMENT METHOD AND APPARATUS

CROSS-REFERENCE TO RELATED APPLICATIONS

This application is a continuation application of International Application No. PCT/CN2018/092202, filed on Jun. 21, 2018, which is based upon and claims priority to Chinese Patent Application No. 201710485199.5, filed on Jun. 23, 2017, the entire content of all of which is incorporated herein by reference.

TECHNICAL FIELD

The present application relates to the field of information technologies, and in particular, to a settlement method and apparatus.

TECHNICAL BACKGROUND

At present, during settlement of offline shopping (such as supermarket shopping), a user first needs to hand over selected items to a checkout counter, and the information (e.g., names and prices, etc.) corresponding to the items is determined one by one by the checkout counter and then the settlement is made according to the determined information corresponding to the items by the checkout counter, and the payment is made by the user.

A more convenient settlement method is needed to improve the efficiency of settlement.

SUMMARY

A settlement apparatus and a settlement method are provided in embodiments of the present application, for solving the problem of low efficiency of settlement.

In one aspect, a settlement apparatus includes: one or more shielding walls; a shielding door configured to, when closed, enclose an electromagnetic shielding space with the shielding walls for isolating signals inside and outside the electromagnetic shielding space; a reader configured to acquire data in an electronic tag in the electromagnetic shielding space; and a controller configured to control opening or closing of the shielding door, control the reader to acquire data, and settle according to the data.

In another aspect, a settlement method includes: opening a shielding door of a settlement apparatus; closing the shielding door when it is determined that a user passes through the shielding door, so that the shielding door encloses an electromagnetic shielding space with shielding walls of the settlement apparatus for isolating signals inside and outside the electromagnetic shielding space; and acquiring, by the settlement apparatus, data in an electronic tag in the electromagnetic shielding space, and settling according to the data.

The technical solutions adopted in the embodiments may achieve the following beneficial effects. At first, a shielding door, when closed, encloses an electromagnetic shielding space with shielding walls for isolating signals inside and outside the electromagnetic shielding space, and then a user may enter the electromagnetic shielding space through the shielding door, and a settlement is performed by acquiring data in an electronic tag attached to an item in the electromagnetic shielding space. With the method provided in the present application, the signals inside and outside the electromagnetic shielding space are isolated by closing the shielding door, and only data in the electronic tag attached to the item carried by the user entering the electromagnetic shielding space is acquired, which not only facilitates a reader to acquire data conveniently by increasing the transmitting power but also avoids the problem of data misreading caused by an excessively large transmitting power, thus improving the execution efficiency of settlement services.

BRIEF DESCRIPTION OF THE DRAWINGS

The accompanying drawings, which are incorporated in and constitute a part of this specification, illustrate embodiments and, together with the description, serve to explain the principles of the present disclosure.

DETAILED DESCRIPTION

In order to make the objectives, technical solutions, and advantages of the present application much clearer, the technical solutions of this specification will be clearly and completely described in the following with reference to specific embodiments of the present application and the corresponding accompanying drawings. It is apparent that the embodiments described are merely exemplary rather than all of the embodiments of the present application. All other embodiments obtained by those of ordinary skill in the art based on the embodiments in this specification without creative efforts shall fall within the protection scope of the present application.

The technical solutions provided in the embodiments of the present application are described in detail in the following with reference to the accompanying drawings.

Figure 1:
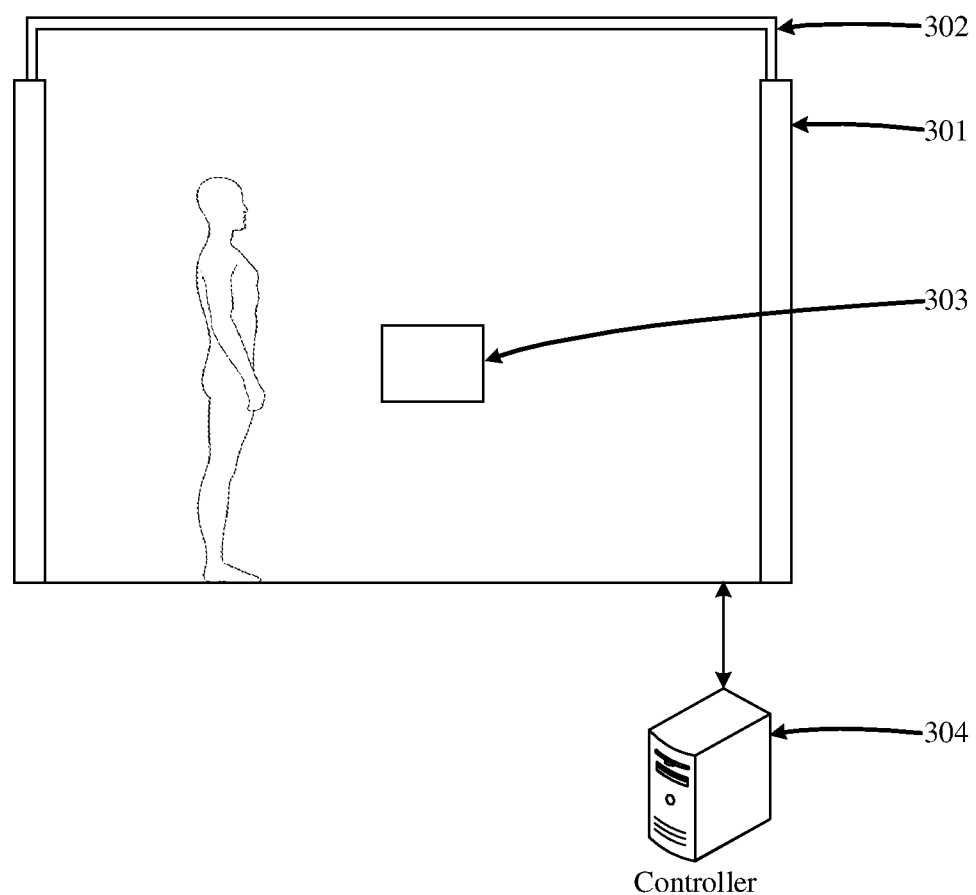
FIG. 1 is a schematic side view diagram of a settlement apparatus according to an embodiment.

FIG. 1 is a schematic side view diagram of a settlement apparatus according to an embodiment. The settlement apparatus includes a shielding door 301, one or more shielding walls 302, a reader 303, and a controller 304.

The shielding door 301 is configured to, when closed, enclose an electromagnetic shielding space with the shielding walls 302 for isolating signals inside and outside the electromagnetic shielding space.

The shielding walls 302 are configured to enclose the electromagnetic shielding space with the closed shielding door 301.

The reader 303 is configured to acquire data in an electronic tag attached to an item in the electromagnetic shielding space.

The controller 304 is configured to control opening or closing of the shielding door 301, control the reader 303 to acquire data, and settle according to the data.

It can be seen from FIG. 1 that the shielding door 301, when closed, encloses an electromagnetic shielding space with the shielding walls 302. The top and the ground of the electromagnetic shielding space may also be regarded as the shielding walls 302. However, for the convenience of subsequent description, the top and the ground are still used for description. In the subsequent description, the top and the ground may be regarded as the shielding walls 302 together.

Figure 2A:
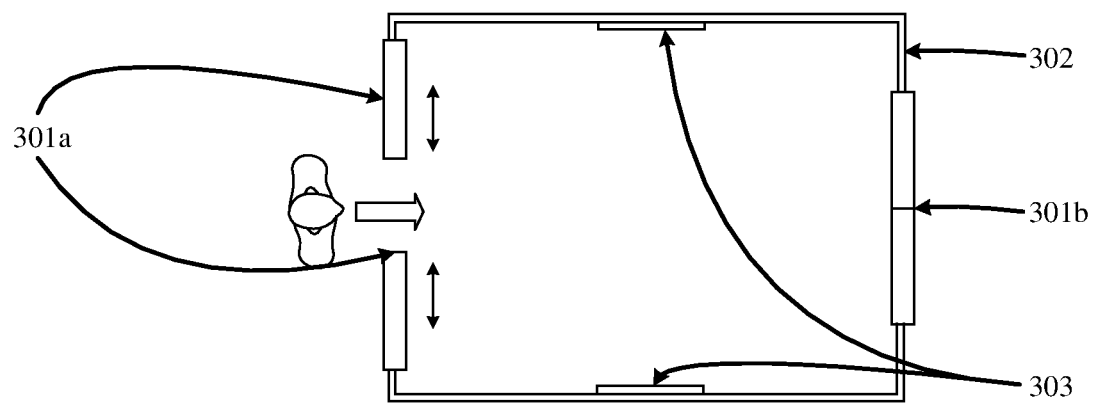
FIG. 2a is a schematic top-view diagram of a settlement apparatus including entrance and exit shielding doors according to an embodiment.
Figure 2B:
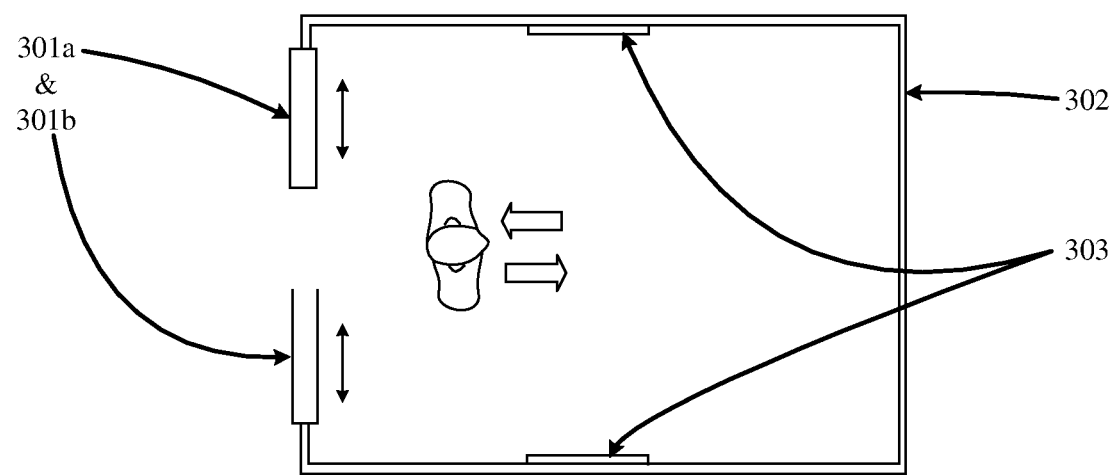
FIG. 2b is a schematic top-view diagram of a settlement apparatus including entrance and exit shielding doors according to another embodiment.

As shown in FIG. 2a, which is a schematic top-view diagram of a settlement apparatus according to an embodiment, the shielding door 301 includes an entrance shielding door 301a through which the user enters the electromagnetic shielding space, and an exit shielding door 301b through which the user exits the electromagnetic shielding space. Alternatively, as shown in FIG. 2b, which is a schematic top-view diagram of a settlement apparatus according to another embodiment, the entrance shielding door 301a and the exit shielding door 301b are the same door, enabling the user to enter or exit the electromagnetic shielding space when opened. Opening and closing of the shielding door 301 may be controlled by the controller 304.

For example, the entrance shielding door 301a, the exit shielding door 301b, and the shielding walls 302 may enclose an electromagnetic shielding space having an outer wall that is 220 cm high, 110 cm wide, and 310 cm long, and an inner wall that is 215 cm high, 100 cm wide, and 292 cm long. The size of the outer wall may be regarded as an external size of the electromagnetic shielding space, and the size of the inner wall may be regarded as an internal size of the electromagnetic shielding space.

In FIG. 2a and FIG. 2b, the double arrows next to the shielding door 301a and the shielding door 301b indicate that the shielding door 301 may be opened and closed in a sliding manner. The bold arrow in front of the user indicates that the user can enter the electromagnetic shielding space through the opened entrance shielding door 301a and exit the electromagnetic shielding space through the opened exit shielding door 301b.

Materials of the shielding door 301 and the shielding walls 302 are not limited in the present application. The shielding door 301 may be a glass door with an electrical conductive dielectric layer (e.g., a glass door with a sandwiched metal mesh) or a metal door. and the shielding walls 302 may be brick-concrete structure walls with an electrical conductive dielectric layer, metal walls, or metal walls having a glass window with an electrical conductive dielectric layer, as long as the shielding door 301 encloses an electromagnetic shielding space with the shielding walls 302 when the shielding door 301 is closed. Moreover, in order to reduce the sense of oppression when the user enters the electromagnetic shielding space, a shielding wall with an electromagnetic shielding glass window and a shielding door made of electromagnetic shielding glass may be selected.

In the electromagnetic shielding glass or the glass door with an electrical conductive dielectric layer, the glass part may have a thickness of 10 cm. The shielding door 301 may have the same clamp-proof function as the automatic door using an existing technology, which is not specifically limited in the present application.

In addition, the shielding door 301 may be any of a rolling shutter door, a sliding door, a side hung door, and a folding door, or another type of door. The entrance shielding door 301a and the exit shielding door 301b may be different types of shielding doors. The shielding door 301 and the shielding walls 302 may also be non-physical apparatuses, such as electromagnetic signal shielding layers or electromagnetic signal interference layers, and so on.

The apparatus may further include a collecting device 305 (FIGS. 3a-3d) configured to collect a biometric feature of a user outside the entrance shielding door 301a. The controller 304 may be configured to send the collected biometric feature to a server, receive an account identifier that is returned by the server and corresponds to the biometric feature, and settle according to the account identifier. Correspondences between account identifiers and biometric features may be pre-stored in the server.

The controller 304 may be configured to control the exit shielding door 301b to be opened after settling according to the data, allowing the user to exit the electromagnetic shielding space through the exit shielding door 301b.

For example, the collecting device 305 may include at least one camera located outside the entrance shielding door 301a for collecting a face image of the user outside the entrance shielding door 301a as the biometric feature of the user.

Figure 3A:
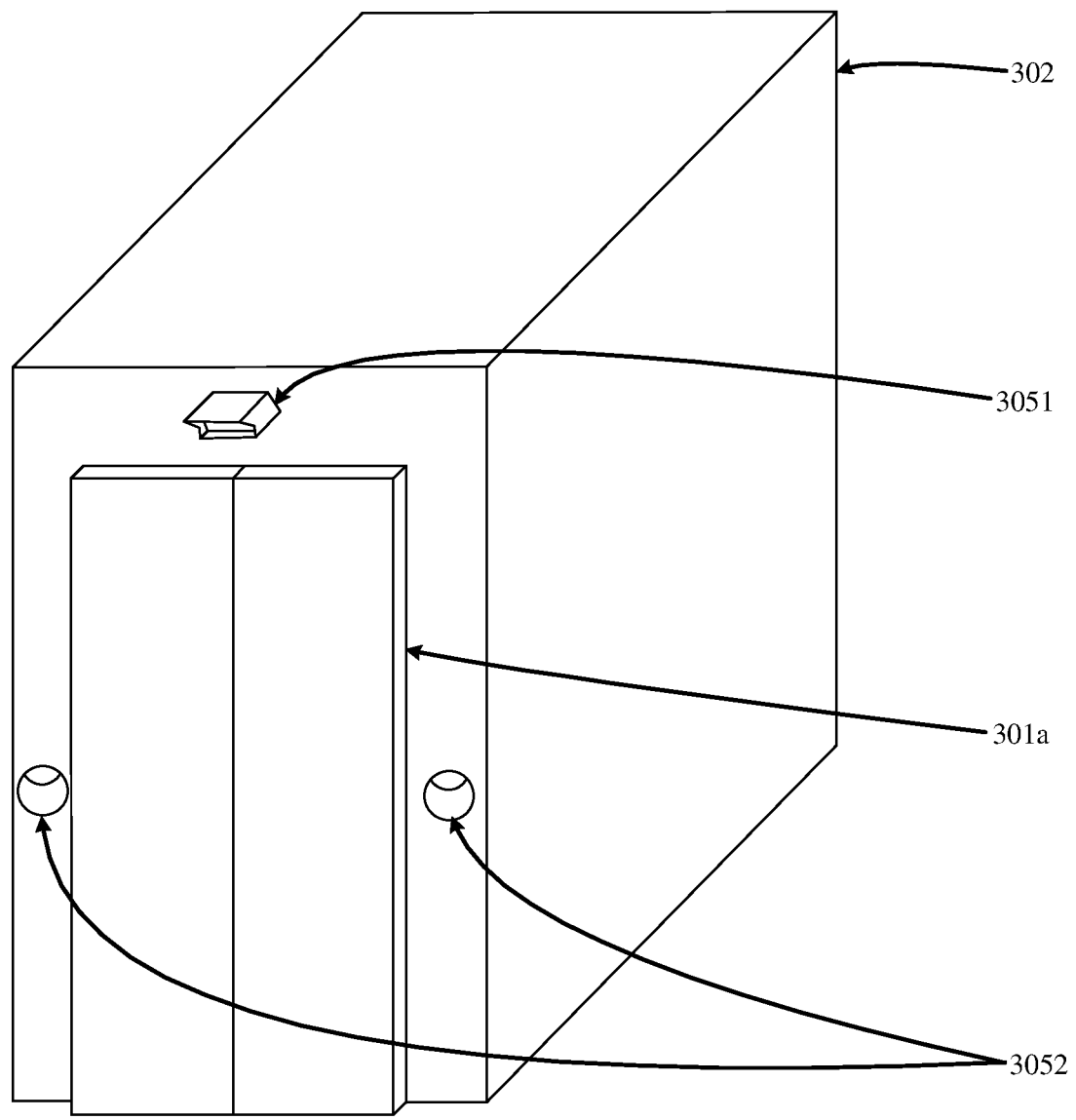
FIG. 3a is a schematic three-dimensional view diagram of a settlement apparatus including a collecting device according to an embodiment.

The camera may include different types of cameras such as a high-speed camera 3051 and at least one dome camera 3052 shown in FIG. 3a, which illustrates a schematic three-dimensional view diagram of a settlement apparatus according to an embodiment. The high-speed camera 3051 may be located outside the entrance shielding door 301a, on an outer side of a shielding wall 302 where the entrance shielding door 301a is located and directly above the entrance shielding door 301a, and form a preset angle (such as an angle of 60 degrees) with the outer side of the shielding wall 302. The at least one dome camera 3052 may be located on the outer side of the shielding wall 302 where the entrance shielding door 301a is located and at two sides of the entrance shielding door 301a, and at a preset height above the ground (such as a position that is 80 cm from the ground). In the embodiment illustrated in FIG. 3a, a plurality of cameras are disposed near the entrance shielding door 301*a*. As a result, collection may be performed from a plurality of angles by the plurality of cameras, so that a face image of the front of the user's face may be collected when the user faces different directions in front of the entrance shielding door 301*a*, and thus the server may better determine the biometric feature of the user and determine a corresponding account identifier.

Furthermore, the collecting device 305 may be disposed outside the entrance shielding door 301*a* (for example, on an outer side of the shielding wall 302 where the entrance shielding door 301*a* is located), and collect the biometric feature of the user before the user enters the electromagnetic shielding space. Then, the controller 304 may control the entrance shielding door 301*a* to be opened when an account identifier that is returned by the server according to the biometric feature and corresponds to the biometric feature is received. That is, when the server determines that the account identifier corresponding to the biometric feature of the user outside the entrance shielding door 301*a* exists, the controller 304 may control the entrance shielding door 301*a* to be opened, allowing the user to enter the electromagnetic shielding space through the entrance shielding door 301*a*.

Figure 3B:
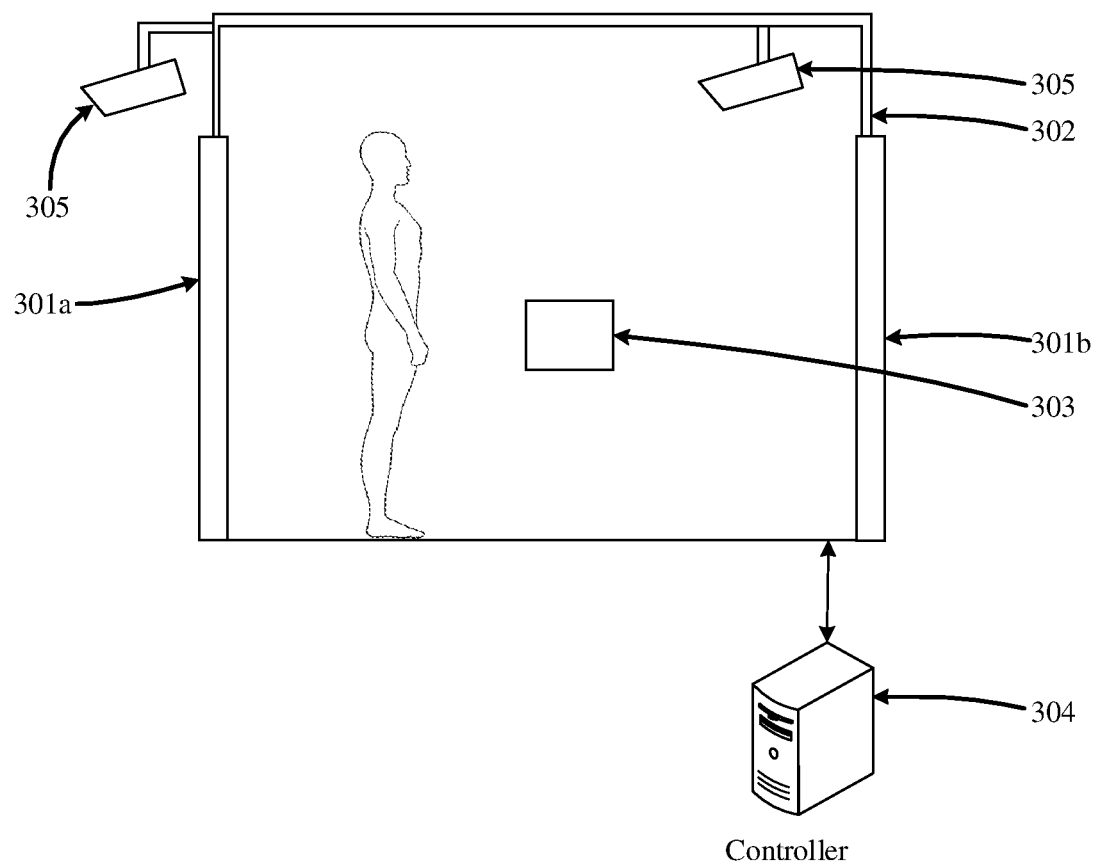
FIG. 3b is a schematic side view diagram of a settlement apparatus including a collecting device according to another embodiment.

Alternatively, as shown in FIG. 3*b*, which illustrates a schematic side view diagram of a settlement apparatus according to another embodiment, the collecting device 305 may be disposed at any position of an inner side of a shielding wall 302 in the electromagnetic shielding space, and collect the biometric feature of the user after the user enters the electromagnetic shielding space. This is not specifically limited here. As shown in FIG. 3*b*, the collecting device 305 may be located on the outer side of the shielding wall 302 where the entrance shielding door 301*a* is located or on the inner side of the shielding wall 302.

Figure 3C:
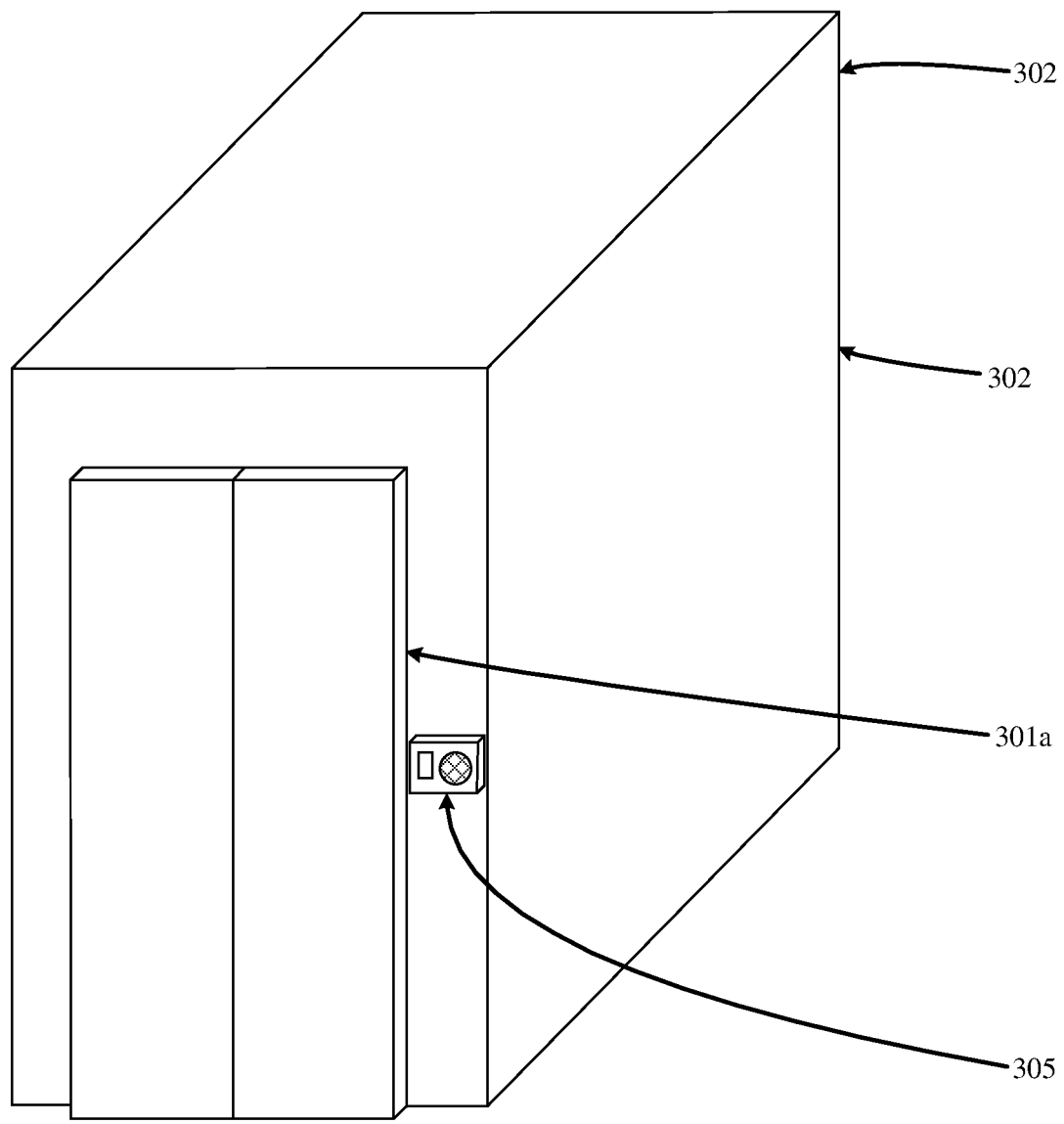
FIG. 3c is a schematic three-dimensional view diagram of a settlement apparatus including a collecting device according to another embodiment.
Figure 3D:
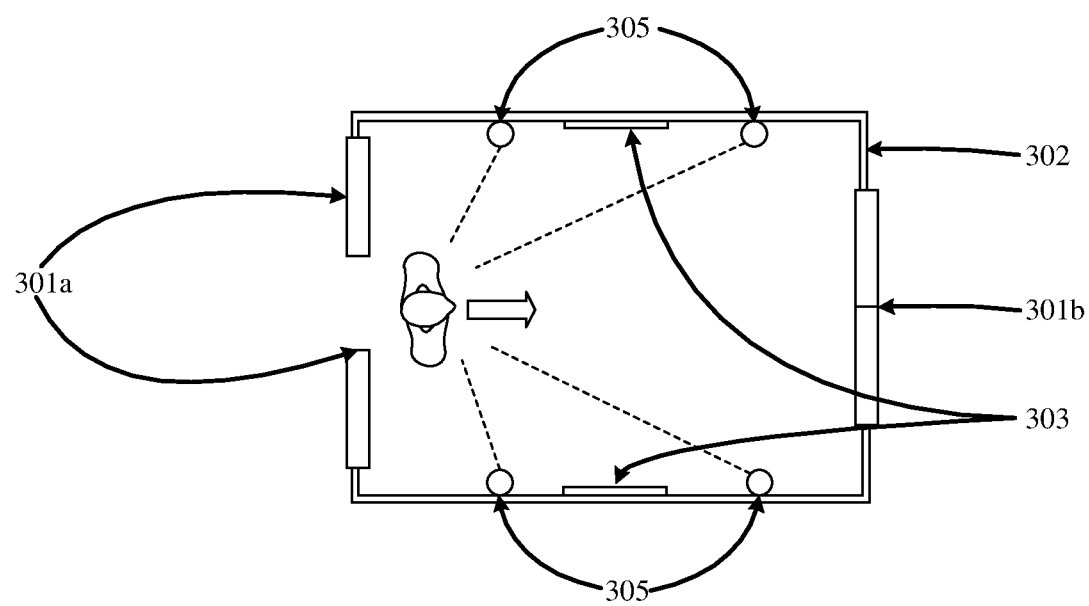
FIG. 3d is a schematic top-view diagram of a settlement apparatus including a collecting device according to another embodiment.

Moreover, the collecting device 305 may be located on an inner side of a top shielding wall 302 or on an inner side of a side-wall shielding wall 302 among the various shielding walls 302. The collecting device 305 may be a high-speed camera or a dome camera, which is not limited here. As shown in FIG. 3*d*, which illustrates a schematic top-view diagram of a settlement apparatus according to another embodiment, when the collecting device 305 is a dome camera and located on the inner side of a side-wall shielding wall 302 among the various shielding walls 302, the collecting device 305 may collect images in the direction of the entrance shielding door 301*a*, for collecting a face image of the user who enters the electromagnetic shielding space through the entrance shielding door 301*a*. In FIG. 3*d*, the dotted arrow indicates the direction in which the collector 305, which is a dome camera, collects images.

The collecting device 305 may also be a fingerprint collector, a voiceprint collector (for example, a microphone), an iris image collector, and so on. Moreover, the collecting device 305 may be located outside the entrance shielding door 301*a*, for collecting the biometric feature of the user before the user enters the electromagnetic shielding space. For example, as shown in FIG. 3*c*, which illustrates a schematic three-dimensional view diagram of a settlement apparatus according to another embodiment, the collecting device 305 is located on the outer side of the shielding wall 302 where the entrance shielding door 301*a* is located. This is not limited in the present application. In FIG. 3*c*, the collecting device 305 may also be a voiceprint collector and a fingerprint collector.

In addition, the settlement apparatus may further include a monitor configured to monitor a position of a user.

Figure 4A:
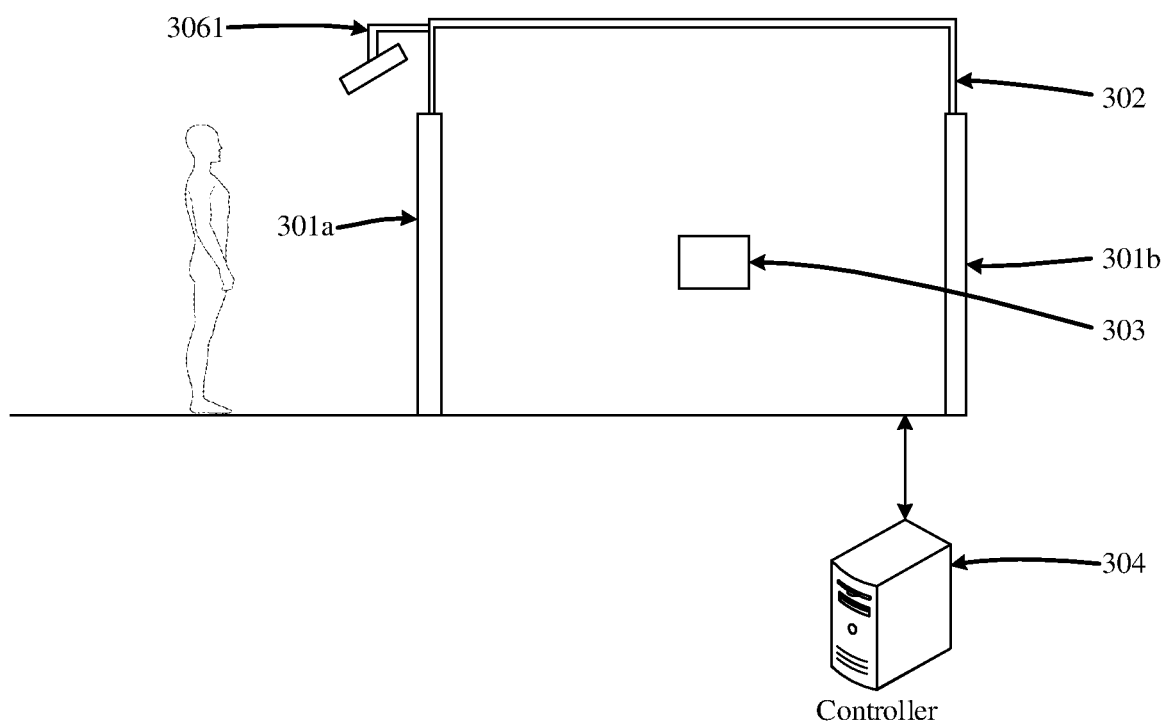
FIG. 4a is a schematic side view diagram of a settlement apparatus including a monitor according to an embodiment.

As shown in FIG. 4*a*, which illustrates a schematic side view diagram of a settlement apparatus according to an embodiment, the monitor may include a first sensor 3061 configured to monitor a distance between a user outside the entrance shielding door 301*a* and the entrance shielding door 301*a*. The controller 304 may be configured to control the entrance shielding door 301*a* to be opened when the controller 304 determines according to the first sensor 3061 that the distance between the user and the entrance shielding door 301*a* is within a specified distance.

Figure 4B:
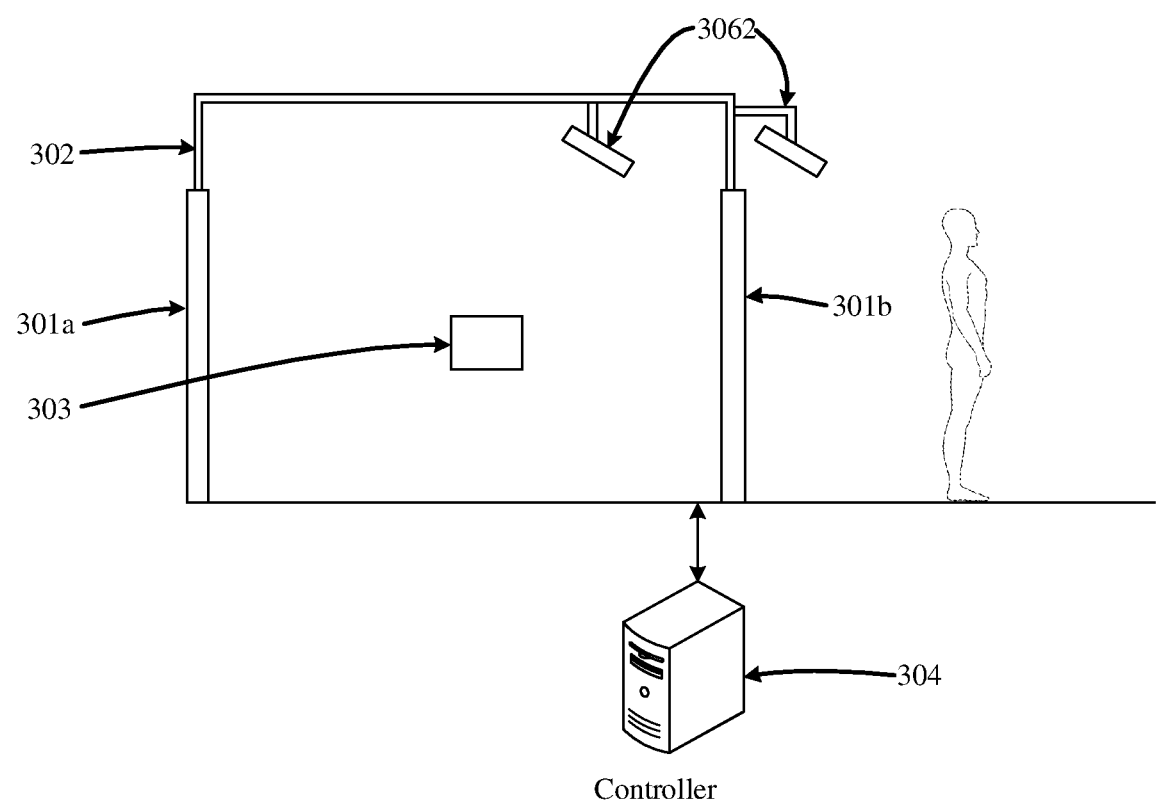
FIG. 4b is a schematic side view diagram of a settlement apparatus including a monitor according to another embodiment.

As shown in FIG. 4*b*, which illustrates a schematic side view diagram of a settlement apparatus according to another embodiment, the monitor may further include a second sensor 3062 configured to monitor a distance between a user outside the exit shielding door 301*b* and the exit shielding door 301*b*. The controller 304 may be configured to control the exit shielding door 301*b* to be opened after settling according to the data, and control the exit shielding door 301*b* to be closed when the controller 304 determines according to the second sensor 3062 that the distance between the user and the exit shielding door 301*b* is beyond a specified distance.

The specified distance may be set according to an actual requirement, and is not specifically limited here.

The first sensor 3061 and the second sensor 3062 may each include a plurality of ultrasonic sensors. The first sensor 3061 may be located on the outer side of the shielding wall 302 where the entrance shielding door 301*a* is located, form a preset angle (such as an angle of 40 degrees) with the outer side of the shielding wall 302, and measure a distance between the user outside the entrance shielding door 301*a* and the entrance shielding door 301*a*. The second sensor 3062 may be located on an outer side of a shielding wall 302 where the exit shielding door 301*b* is located, form a preset angle (such as an angle of 40 degrees) with the outer side of the shielding wall 302, and measure a distance between the user outside the exit shielding door 301*b* and the exit shielding door 301*b*. Alternatively and/or additionally, the second sensor 3062 may also be located at an inner side of the top of the electromagnetic shielding space, at a location near the exit shielding door 301*b*, and form a preset angle (such as an angle of 50 degrees) with the inner side of the top. The foregoing is feasible as long as the first sensor 3061 may determine the distance between a user outside the entrance shielding door 301*a* and the entrance shielding door 301*a* and the second sensor 3062 may determine the distance between a user and the exit shielding door 301*b* when the user exits the exit shielding door 301*b*.

In the embodiment illustrated in FIG. 4*a*, the first sensor 3061 monitors a distance between a user and the entrance shielding door 301*a*. As the entrance shielding door 301*a* is in a closed state before the user enters the entrance shielding door 301*a*, the first sensor 3061 may be located outside the entrance shielding door to detect a distance between the user and the entrance shielding door 301*a*.

In the embodiment illustrated in FIG. 4*b*, the second sensor 3062 monitors a distance between a user and the exit shielding door 301*b* according to an embodiment. The second sensor 3062 monitors a distance between the user and the exit shielding door 301*b* after the controller 304 controls the exit shielding door 301*b* to be opened. Moreover, as described above, the second sensor 3062 may be located on the outer side of the shielding wall 302 where the exit shielding door 301*b* is located, or at the top of the electromagnetic shielding space at a location near the exit shielding door 301*b*.

A distance between the user and the camera may also be determined according to an image collected by a camera. Therefore, in an embodiment, the first sensor 3061 and the second sensor 3062 may be cameras. The controller 304 may determine the distance between the user and the entrance shielding door 301*a* and the distance between the user and the exit shielding door 301*b* according to the images of the user collected by the cameras. Accordingly, the collector 305 and the first sensor 3061 may be the same device, which may both collect the biometric feature of the user and determine the distance between the user and the entrance shielding door 301*a*.

For example, the controller 304 may send the received image collected by the camera to a server. The server may use a method of determining a user distance according to an image in the existing technologies to determine a distance between the user and the camera, determine a distance between the user and the entrance shielding door 301*a* according to a position relationship between the camera and the entrance shielding door 301*a*, and return the distance to the controller 304. Similarly, for the exit shielding door 301*b*, a distance between the user and the exit shielding door 301*b* may also be determined by the camera.

Figure 5A:
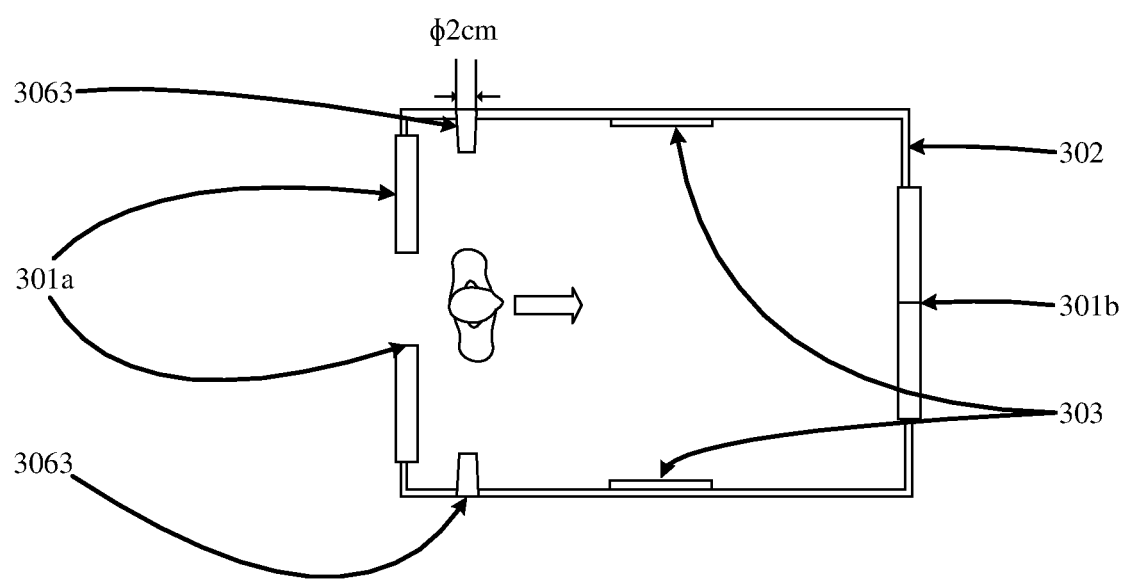
FIG. 5a is a schematic side view diagram of a settlement apparatus including a monitor according to another embodiment.

As shown in FIG. 5*a*, which illustrates a schematic top-view diagram of a settlement apparatus according to another embodiment, the monitor may further include a third sensor 3063 configured to monitor a position of a user in the electromagnetic shielding space. The controller 304 may be configured to control, when the controller 304 determines according to the third sensor 3063 that the user passes through the shielding door 301, the shielding door 301 through which the user passes to be closed. When the shielding door 301 is the entrance shielding door 301*a*, the controller 304 may control the entrance shielding door 301*a* to be closed after the controller 304 determines according to the third sensor 3063 that the user passes through the entrance shielding door 301*a*. Also, the controller 304 may control the exit shielding door 301*b* to be opened after the settlement, and the controller 304 may further control the exit shielding door 301*b* to be closed when the controller 304 determines according to the third sensor 3063 that the user exits the exit shielding door 301*b*. When the shielding door 301 is both the entrance shielding door 301*a* and the exit shielding door 301*b*, the controller 304 may control the shielding door 301 to be closed when the user enters the electromagnetic shielding space through the shielding door 301. The controller 304 may control the shielding door 301 to be opened after the settlement, and then the controller 304 may further control the shielding door 301 to be closed when the controller 304 determines according to the third sensor 3063 that the user exits the electromagnetic shielding space through the shielding door 301.

As shown in FIG. 5*a*, the third sensor 3063 may include at least one infrared emission detector, and may be located on the shielding wall 302. A distance between the third sensor 3063 and the shielding wall 302 where the entrance shielding door 301*a* is located may be 30 cm, and the third sensor 3063 may be disposed in a round hole which is preset on the shielding wall 302. The round hole may have a diameter of 2 cm. Thus, the infrared emission detector is located on the shielding wall 302 at a location near the entrance shielding door 301*a*. The controller 304 may determine according to a signal received by the infrared emission detector that the user enters the electromagnetic shielding space through the entrance shielding door 301*a*, and the controller 304 may control the entrance shielding door 301*a* to be closed. Moreover, as shown in FIG. 5*c*, which is a schematic sectional view diagram of a shielding wall according to an embodiment, in order to prevent the round hole where the third sensor 3063 is located from leaking electromagnetic signals, the round hole may be electromagnetically shielded (for example, covered with an electromagnetic shielding material X). In FIG. 5*c*, X is an electromagnetic shielding material.

Figure 5B:
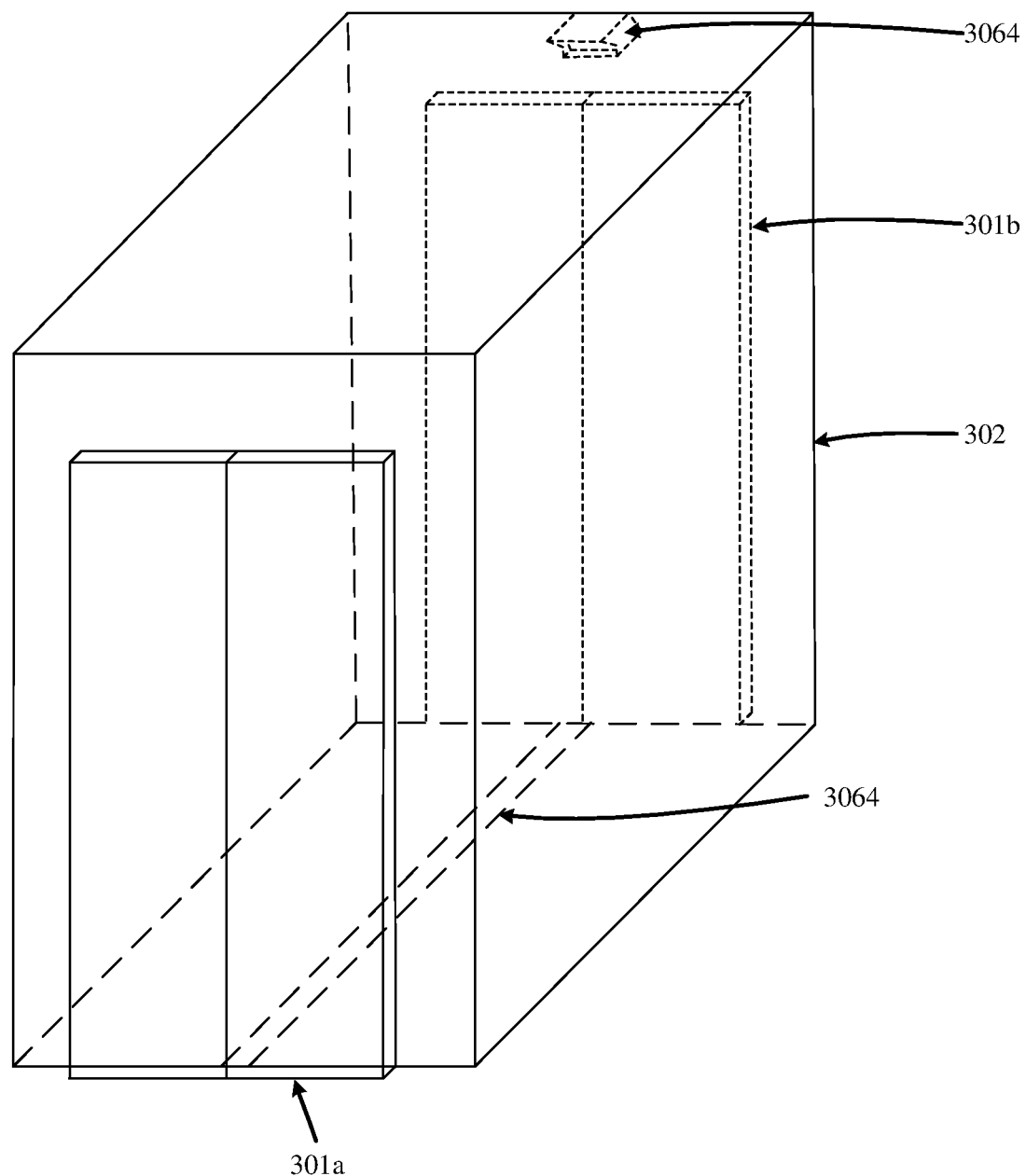
FIG. 5b is a schematic three-dimensional view diagram of a settlement apparatus including a monitor according to another embodiment.
Figure 5C:
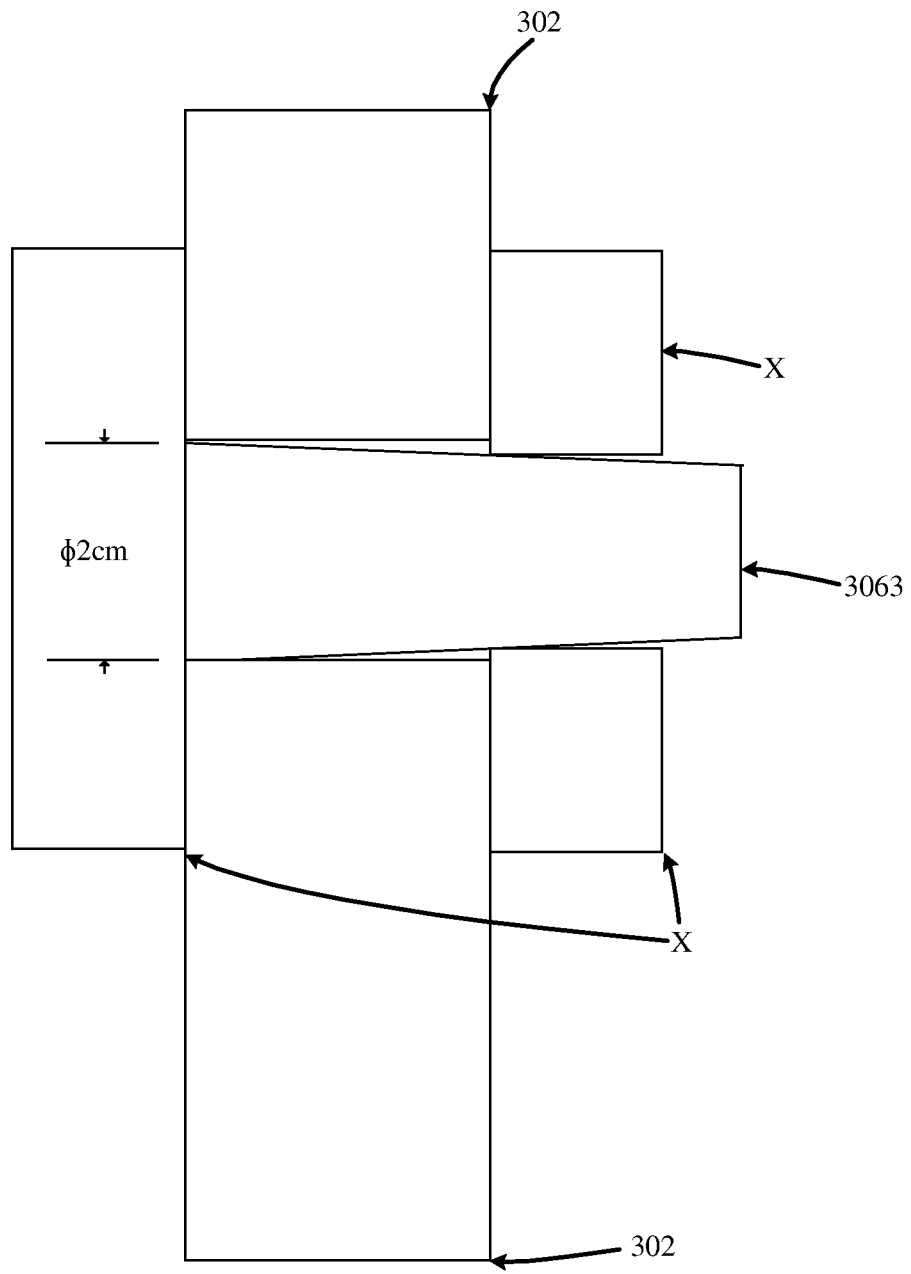
FIG. 5c is a is a schematic sectional view diagram of a shielding wall according to an embodiment.

Furthermore, as shown in FIG. 5*b*, which illustrates a schematic three-dimensional view diagram of a settlement apparatus according to another embodiment, the monitor may further include a fourth sensor 3064 configured to monitor the position of the user in the electromagnetic shielding space. The controller 304 is configured to control the reader 303 to acquire the data in the electronic tag attached to the item in the electromagnetic shielding space when the controller 304 determines according to the fourth sensor 3064 that the user is located at a first specified position in the electromagnetic shielding space. The first specified position may be set as required, for example, set to be a position most suitable for reading the data in the electronic tag.

As shown in FIG. 5*b*, the fourth sensor 3064 may include an infrared light strip (light projector) and a light receptor. The infrared light strip may extend from the ground under the entrance shielding door 301*a* to the ground under the exit shielding door 301*b* and may emit infrared rays, and the light receptor may be configured to receive the infrared rays emitted by the infrared light strip. When the user enters the electromagnetic shielding space, the body of the user blocks some infrared rays emitted by the infrared light strip, and the light receptor may receive the unblocked infrared rays. The controller 304 may determine the position of the user in the electromagnetic shielding space according to occlusion of the infrared rays. The light receptor and the collector 305 may be integrated onto the same device, and the same device may both collect the biometric feature of the user and receive the infrared rays emitted by the infrared light strip.

Figure 6A:
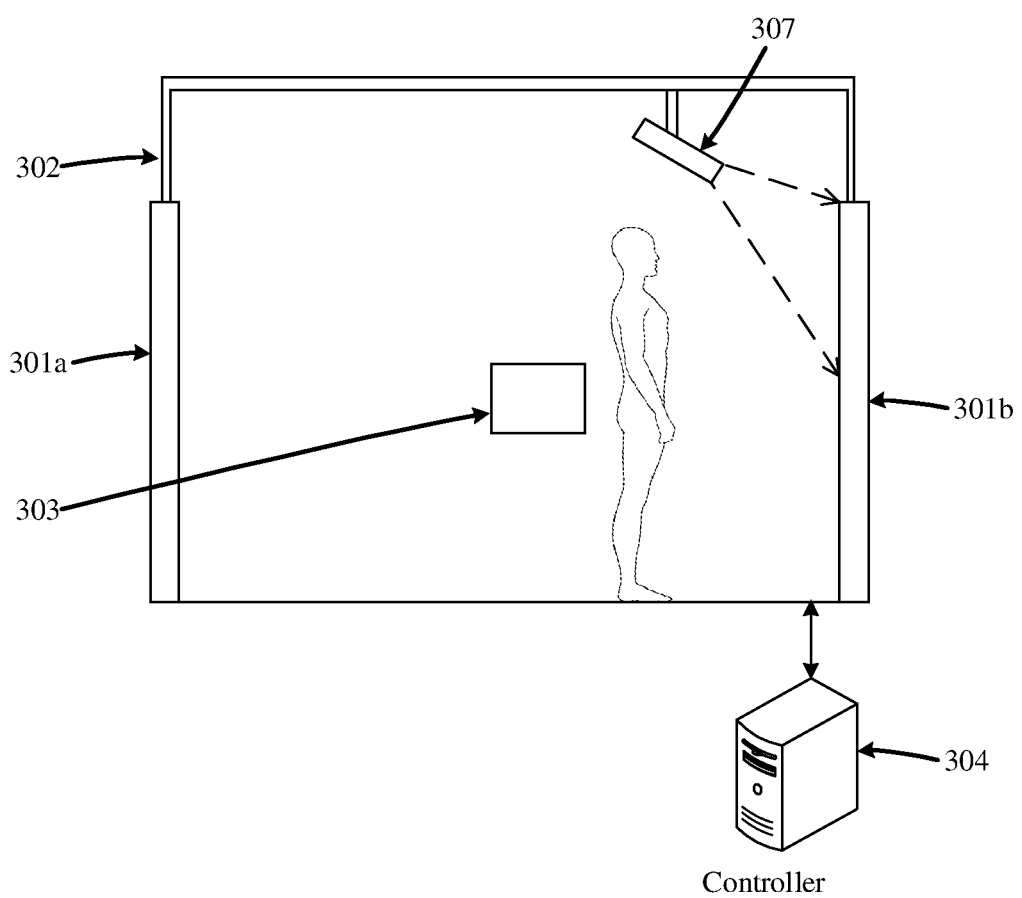
FIG. 6a is a schematic side view diagram of a settlement apparatus including an information display device according to an embodiment.
Figure 6B:
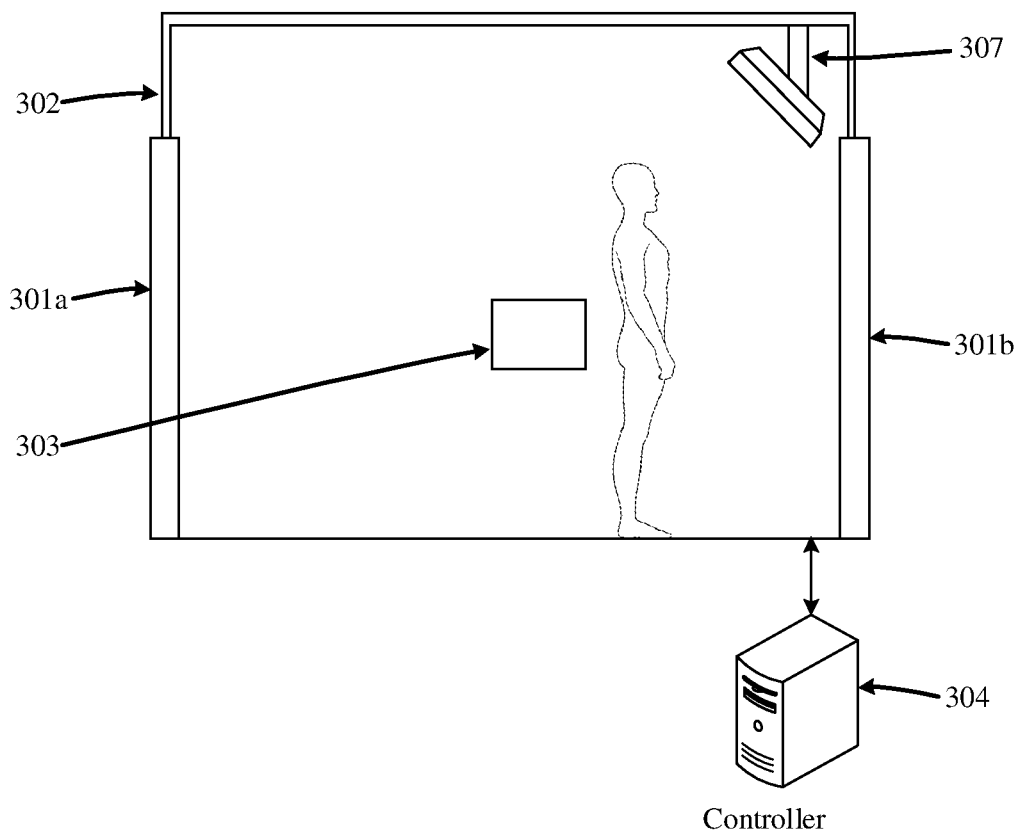
FIG. 6b is schematic side view diagram of a settlement apparatus including an information display device according to another embodiment.

As shown in FIG. 6*a* and FIG. 6*b*, which illustrate a settlement apparatus according to an embodiment, the apparatus may further include an information display device 307 configured to receive the data sent by the controller 304 and display the data to the user in the electromagnetic shielding space. The controller 304 may send to the information display device 307 the data in the electronic tag attached to the item carried by the user entering the electromagnetic shielding space which is acquired by the reader 303. The controller 304 may also send information produced after the settlement to the information display 305.

The information display device 307 may be a display, a projector or other devices. Content of the information displayed by the information display device 307 is not specifically limited in the present application.

In the embodiment illustrated in FIG. 6*a*, the information display device 307 may be a display screen, and may be located on the shielding wall 302 where the exit shielding door 301*b* is located or on the exit shielding door 301*b* and displays information towards the entrance shielding door 301*a*. In FIG. 6*b*, when the information display device 307 is a projector, the information display device 307 may be located on an inner side of the shielding wall 302 at one side of the exit shielding door 301*b* and project to the exit shielding door 301*b* to display information.

Figure 7A:
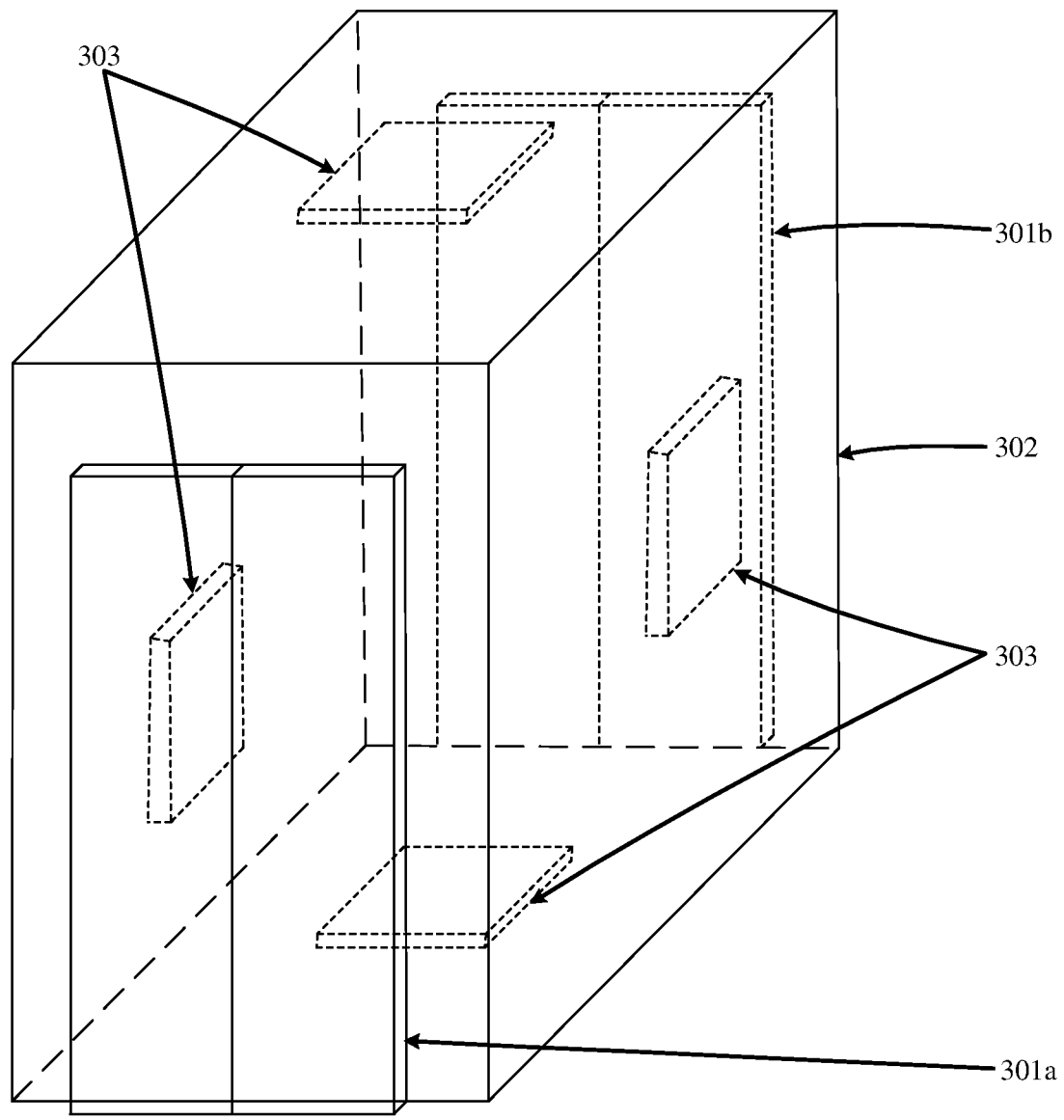
FIG. 7a is a schematic three-dimensional diagram of a settlement apparatus including a reader according to an embodiment.

The reader 303 may be an RFID (radio-frequency identification) reader, and the electronic tag in an embodiment may be an RFID electronic tag. In some embodiments, there may be a plurality of readers 303. As shown in FIG. 7*a*, which is a schematic three-dimensional diagram of a settlement apparatus according to an embodiment, the readers 303 may be disposed at second specified positions of the various shielding walls, and acquire, at different positions, the data in the electronic tag attached to the item carried by the user entering the electromagnetic shielding space. In the embodiment illustrated in FIG. 7a, the readers 303 are located at two sides of the electromagnetic shielding space, and on the top and bottom shielding walls 302, and the readers 303 located at the two sides of the shielding walls 302 are at different heights from the ground. The readers 303 may be square readers 303 with sides that are 25 cm long, and the heights of the readers 303 located at two sides of the shielding walls 302 are 140 cm and 70 cm, respectively. A projection position of the top reader 303 on the ground coincides with the bottom reader 303.

The RFID electronic tag in the embodiment may be a passive RFID electronic tag. The reader 303 may acquire data in the passive RFID electronic tag in the electromagnetic shielding space. Moreover, as the reader 303 may be disposed in the electromagnetic shielding space according to the embodiment, the transmitting power of the reader 303 may be increased to improve the efficiency of acquiring data in the passive RFID electronic tag by the reader 303, thus improving the efficiency of settlement.

Furthermore, the average heights of men and women in China are 167.1 cm and 155.8 cm respectively, and a user generally may carry items by hand, by pushing a shopping cart, by carrying a shopping basket, or in other manners. Therefore, in order to make the reader 303 closer to an electronic tag attached to an item carried by the user when acquiring data and improve the efficiency of data acquisition, the reader 303 may be set at 70 cm to 140 cm above the ground in the embodiment. Specifically, two readers 303 may be disposed at 70 cm and 140 cm above ground, respectively. For example, the readers on the two side walls as shown in FIG. 7a are located at 70 cm above the ground and 140 cm above the ground respectively.

Figure 7B:
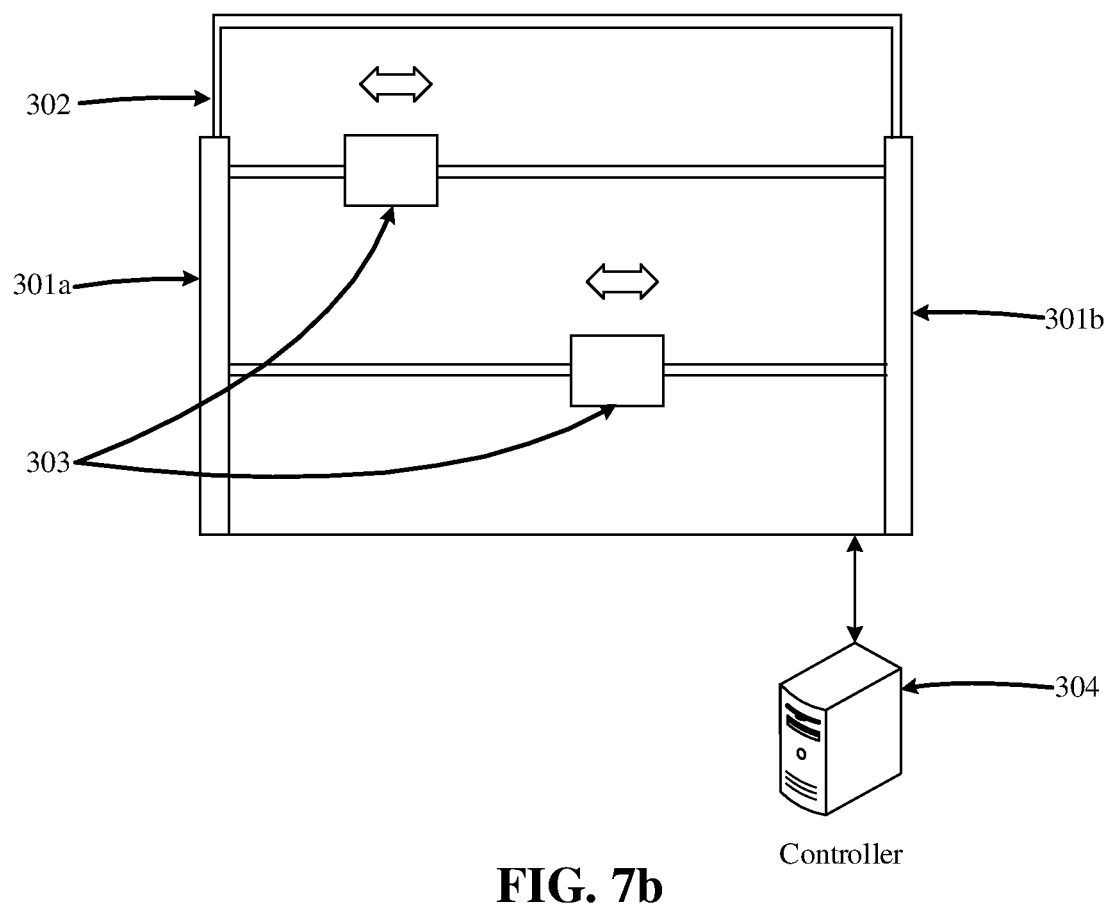
FIG. 7b is a schematic side view diagram of a settlement apparatus including a reader according to another embodiment.

In addition, users may carry items in various manners, and volumes and quantities of items carried by different users are not exactly the same. Therefore, as shown in FIG. 7b, which is a schematic side view diagram of a settlement apparatus according to an embodiment, in order to reduce the situations in which the reader 303 misses reading data, the reader 303 may be disposed on a track and acquire data by moving on the track. In the embodiment illustrated in FIG. 7b, a shielding wall 302 is provided with a track to allow a reader 303 to move. As can be seen, the shielding wall 302 may be provided with a plurality of readers 303, and each reader 303 may be located on a corresponding track and move on the shielding wall 302. In FIG. 7b, the double arrows indicate that the readers 303 may move back and forth on the tracks. Therefore, even if an item carried by the user is placed in a corner of the electromagnetic shielding space, data in an electronic tag attached to the item may be easily acquired through the movement of the reader 303.

It should be noted that whether only one or several readers 303 are provided and whether the readers 303 are fixed or removable, in the embodiment, as the reader 303 is located on an inner side of the shielding wall 302 and in the electromagnetic shielding space, radio frequency signals transmitted by the reader 303 may not penetrate through the shielding door 301 and the shielding walls 302 to the outside of the electromagnetic shielding space, and signals outside the electromagnetic shielding space may not enter the electromagnetic shielding space and be received by the reader 303. As a result, it can be determined that the data acquired by the reader 303 is the data in the electronic tag attached to the item carried by the user entering the electromagnetic shielding space, avoiding data misreading by the reader 303. Specifically, when the electronic tag is a passive RFID electronic tag, the transmitting power of the reader 303 may be set higher to avoid that a signal transmitted by the reader 303 is difficult to be received by the passive RFID electronic tag and avoid the reader 303 from missing reading the data (for example, mutual occlusion among a plurality of passive RFID electronic tags results in that the occluded passive RFID electronic tag cannot receive the signal transmitted by the reader 303). At the same time, even if the transmitting power of the reader 303 is high, the reader 303 is also prevented from data misreading as the radio frequency signal transmitted by the reader 303 may not penetrate through the shielding door 301 and the shielding walls 302 to the outside of the electromagnetic shielding space. The transmitting power of the reader 303 may be set as required, which is not specifically limited in the present embodiment, as long as the reader 303 may not miss reading the data in the electronic tag attached to the item carried by the user entering the electromagnetic shielding space.

Figure 8:
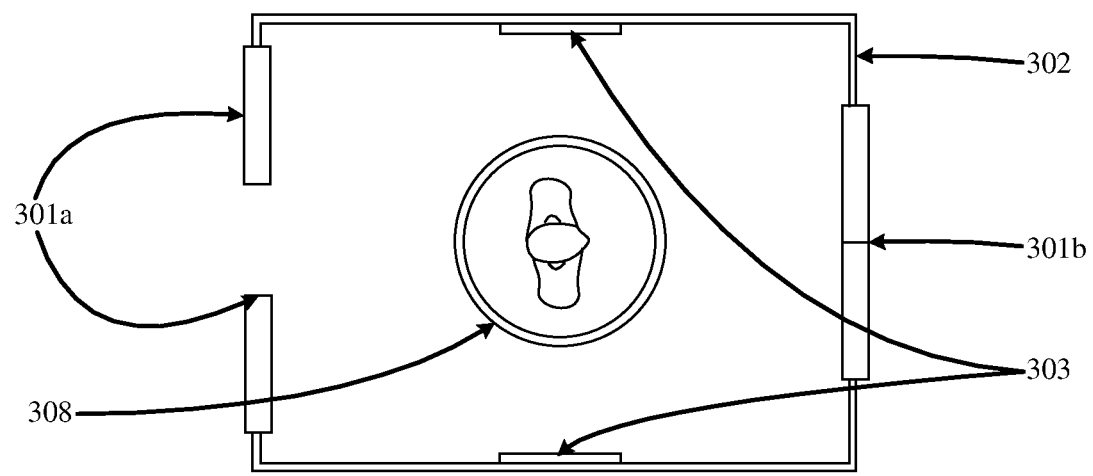
FIG. 8 is a schematic top-view diagram of a settlement apparatus including a position prompting device according to an embodiment.

The settlement apparatus according to the embodiment may further include a position prompting device 308 (FIG. 8) configured to send out a prompt. The controller 304 may be configured to control the position prompting device 308 to send out the prompt when the controller 304 determines according to the monitor 306 that the user is located at the first specified position in the electromagnetic shielding space, for prompting the user that he/she is located at the first specified position. As shown in FIG. 8, which is a schematic top-view diagram of a settlement apparatus according to an embodiment, the position prompting device 308 may be a luminous light strip. When the user is located at the first specified position, the luminous light strip may emit light under the control of the controller 304 to prompt that the user is located at the first specified position. The first specified position may be set according to the second specified position of the reader 303 to improve the efficiency of data acquisition by the reader 303 located at the second specified position.

In addition, in order to prevent the reader 303 from misreading the data when the shielding door 301 is opened, the controller 304 may control the shielding door 301 to be closed when the controller 304 determines according to the monitor 306 that there is a user in the electromagnetic shielding space, and the controller 304 may control the shielding door 301 to be opened until the controller 304 completes the settlement.

Alternatively, when the controller 304 controls the shielding door 301 to be opened, the reader 303 is stopped from acquiring data. The controller 304 controls the reader 303 to acquire data only when the controller 304 determines that the shielding door 301 is closed. A specific implementation manner is not limited here, as long as the reader 303 may acquire data in the electronic tag in the electromagnetic shielding space at the time of data acquisition.

Figure 9:
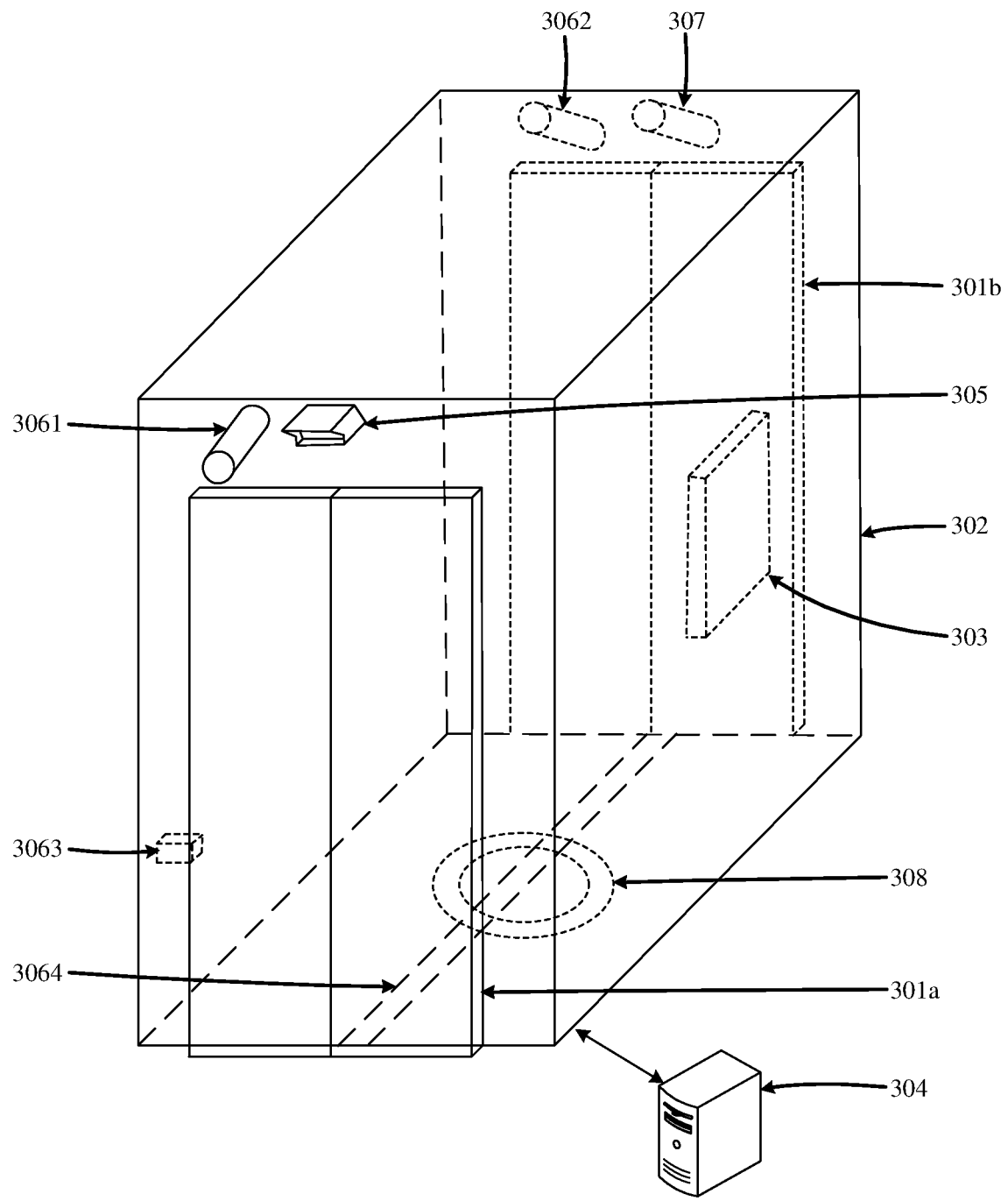
FIG. 9 is a schematic three-dimensional diagram of a settlement apparatus according to an embodiment.

FIG. 9 is a three-dimensional schematic diagram of a settlement apparatus according to an embodiment. As shown in FIG. 9, the settlement apparatus includes an entrance shielding door 301a, an exit shielding door 301b, a shielding wall 302, a reader 303, a controller 304, a collecting device 305, a first sensor 3061, a second sensor 3062, a third sensor 3063, a fourth sensor 3064, an information display device 307, and a position prompting device 308. Each of these elements is described above in connection with FIGS. 1-8.

Figure 10:
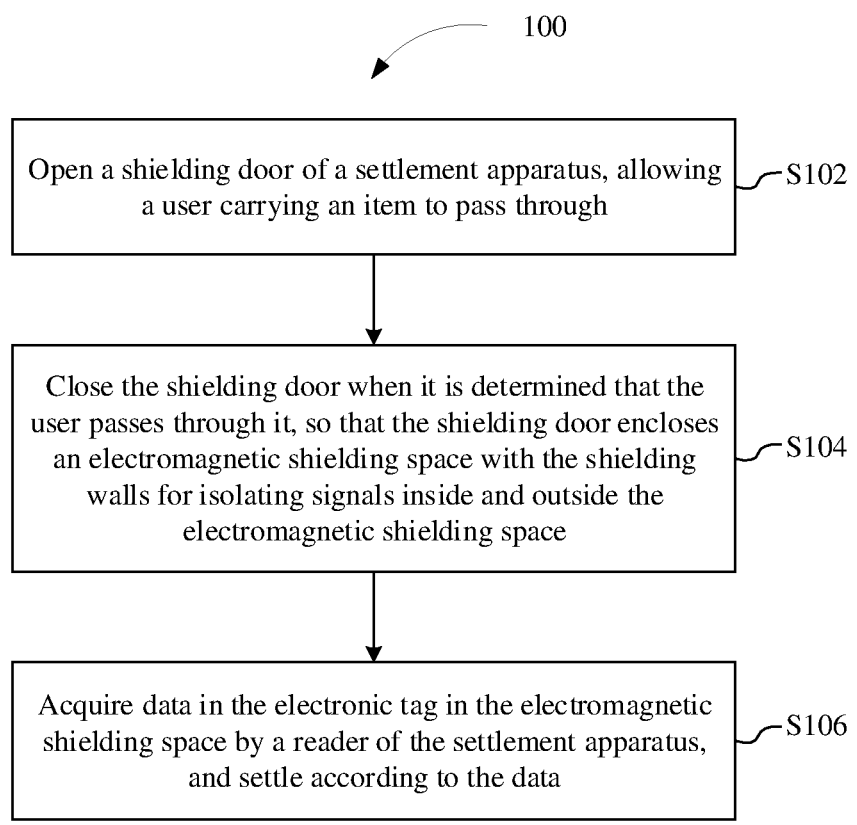
FIG. 10 shows a settlement process according to an embodiment.

FIG. 10 is a settlement process 100 according to an embodiment. The settlement process 100 may be implemented in a settlement apparatus, for example, the settlement apparatus as shown in FIG. 1. The settlement apparatus may include a shielding door, one or more shielding walls, and a reader.

As shown in FIG. 10, the settlement process 100 may include the following steps.

In step S102, the shielding door is opened.

In order to solve the problem in the existing technologies that it is difficult to rapidly acquire data in a large number of electronic tags while avoiding misreading of the data in the electronic tags, in the embodiments, a position of a user carrying an item is monitored, and the shielding door of the settlement apparatus is opened when the user is determined to be outside the shielding door, and the shielding door is closed when the user is determined to pass through the shielding door, so that the shielding door encloses an electromagnetic shielding space with the shielding walls of the settlement apparatus, and the reader in the electromagnetic shielding space can only acquire data in the electronic tag attached to the item carried by the user in the electromagnetic shielding space. As a result, even if the transmitting power of the reader is increased to enable the reader to acquire data in electronic tags in a larger range, the electromagnetic shielding space may also avoid the reader from acquiring data in electronic tags outside the electromagnetic shielding space, thus improving the efficiency of settlement.

For example, the settlement apparatus may include a shielding door and one or more shielding walls. The electromagnetic shielding space may be a closed space including an entrance shielding door and an exit shielding door. That is, when the entrance and exit shielding doors are closed, the space enclosed by the entrance and exit shielding doors and the shielding walls is an electromagnetic shielding space. The user may enter the electromagnetic shielding space through the entrance shielding door, and exit the electromagnetic shielding space through the exit shielding door. The shielding door may be manually opened and closed by the user or opened and closed by the controller, which is not limited in the present application.

The settlement apparatus may further include a collector configured to collect a biometric feature of a user outside the entrance shielding door and send the collected biometric feature to a server for authentication. When the server determines, according to correspondences between stored account identifiers and biometric features, an account identifier corresponding to the biometric feature collected by the settlement apparatus, the server may return the determined account identifier to the controller, and the controller may control the entrance shielding door to be opened, allowing the user to pass through. When the controller has not received the account identifier returned by the server, the controller may determine that user authentication fails, and the entrance shielding door may not be opened.

Further, the settlement apparatus may further include a monitor, and a distance between the user outside the shielding door and the shielding door may be acquired by the monitor and sent to the controller. The controller may control the shielding door to be opened when determining that the distance from the user outside the shielding door to the shielding door is within a specified distance, for guiding the user to enter the electromagnetic shielding space through the shielding door, control the shielding door to be closed when determining that the user is in the electromagnetic shielding space, and perform subsequent operations.

Furthermore, the controller may control the shielding door to be opened when determining that the distance from the user outside the shielding door to the shielding door is within a specified distance, for guiding the user to enter the electromagnetic shielding space through the shielding door. After the user enters the electromagnetic shielding space, a biometric feature of the user may be collected by a collector on the shielding wall, and a corresponding account identifier may be determined for settlement.

The server may be a third-party server. The controller may send the collected biometric feature to the server, and the third-party server may determine an account identifier corresponding to the collected biometric feature according to correspondences between registered account identifiers and biometric features, and return the account identifier to the controller. The server may also be a server of a merchant (that is, the server and the settlement apparatus may be regarded as a party opposite to the user). In some embodiments, the server may be a server specifically designed to provide authentication for the settlement apparatus. The server may store account identifiers provided by users when entering a shop and biometric features of the users collected when the users enter the shop. The server may determine, according to the account identifiers of the users entering the shop and the biometric features of the users entering the shop that are stored, an account identifier corresponding to the biometric feature sent by the controller.

In S104, the shielding door is closed when it is determined that the user passes through the shielding door, so that the shielding door encloses an electromagnetic shielding space with the shielding walls for isolating signals inside and outside the electromagnetic shielding space.

In the embodiment, when the controller determines that the user is in the electromagnetic shielding space, the controller may control the shielding door to be closed so that the user is located in the electromagnetic shielding space and the reader in the electromagnetic shielding space can only collect data in an electronic tag attached to an item carried by the user. As a result, the reader would not misread data even if the transmitting power of the reader is high. At the same time, increasing the transmitting power of the reader may also avoid the disadvantage that the user needs to adjust the distance between the electronic tag and the reader, thus improving the efficiency of data acquisition and the efficiency of settlement.

For example, when the entrance shielding door is opened, the controller may guide the user to enter the electromagnetic shielding space. After the controller determines that the user passes through the entrance shielding door, the controller may control the entrance shielding door to be closed.

The controller may guide the user to enter the electromagnetic shielding space by playing back an audio for the user or by displaying image information. For example, when it is determined that the user is within a specified distance, the controller may send an audio of "please enter the door" to the user to guide the user to enter the electromagnetic shielding space. The specific manner of guiding the user is not limited here. As the exit shielding door is a door through which the user exits the electromagnetic shielding space, the exit shielding door may be closed by default when the user enters the electromagnetic shielding space.

In S106, data in an electronic tag attached to the item in the electromagnetic shielding space is acquired by the reader, and settlement is performed according to the data.

In the embodiment, after the controller controls the entrance shielding space to be closed to form the electromagnetic shielding space, the data in the electronic tag attached to the item carried by the user in the electromagnetic shielding space may be acquired by the reader on the shielding wall in the electromagnetic shielding space, and settlement may be performed according to the acquired data (for example, a payment service is initiated to a customer according to the acquired data).

For example, when the controller determines that the user is in the electromagnetic shielding space, the controller controls the reader to transmit a signal and acquire data in the electronic tags carried by the user. In order to reduce the occurrence of the reader missing reading data, the transmitting power of the reader may be set higher, so that when electronic tags carried by the user are mutually occluded, the occluded electronic tags may also receive the signal sent by the reader and return the data included. The transmitting power of the reader may correspond to the size of the electromagnetic shielding space, that is, the larger the electromagnetic shielding space is, the higher the transmitting power of the reader is. The missing reading data may occur when the reader does not acquire data in all the electronic tags in the electromagnetic shielding space.

Further, in order to reduce the occurrence of missing reading data, there may be a plurality of readers in the electromagnetic shielding space that may transmit signals from different directions, so that even if an electronic tag heavily occluded in one direction cannot receive a signal sent by a reader in this direction, the electronic tag may also receive signals transmitted by other readers in other directions.

Furthermore, in order to avoid the problem that a fixed reader has a blind spot of signal transmission and is easy to be occluded to miss reading data, in an embodiment, the reader may move on a preset track to collect data in the electronic tag attached to the item carried by the user in the electromagnetic shielding space and send the data to the controller. The track may encircle the electromagnetic shielding space to allow the signal transmitted by the reader to be transmitted at different angles.

In addition, when the controller determines that data of various electronic tags in the electromagnetic shielding space have all been acquired, the controller may further control the exit shielding door to be opened, and guide the user to exit the electromagnetic shielding space with a method similar to that in step S104. Moreover, after the controller determines according to the monitor that the user exits the electromagnetic shielding space, the controller may control the exit shielding door to be closed, and step S102 to step S106 are repeated to collect data in electronic tags carried by other users. The controller may determine whether data acquisition is completed according to whether a time length of data collection performed by the reader reaches a preset time length.

Based on the settlement process shown in FIG. 10 and the settlement apparatus shown in FIG. 1, at first, the shielding door is opened, then, the shielding door is closed when it is determined that the user passes through the shielding door, so that the shielding door encloses an electromagnetic shielding space with the shielding walls for isolating signals inside and outside the electromagnetic shielding space. Finally, data in the electronic tag attached to the item in the electromagnetic shielding space is acquired by the reader, and settlement is performed according to the data. With the method provided in the embodiments, as the reader is located in the electromagnetic shielding space when acquiring data, the disadvantage of data misreading caused by the increase of the transmitting power of the reader and the disadvantage of having to manually adjust the distance between the electronic tag and the reader may be avoided, thus improving the efficiency of settlement.

In addition, in step S102, the controller may determine the position of the user according to an image collected by the monitor. The monitor may be a camera (for example, a high-speed camera). Accordingly, the controller may determine a user closest to the entrance shielding door according to the image collected by the camera and monitor the position of the user. Moreover, when determining that a distance from the user to the entrance shielding door is within a specified distance, the controller may further collect a biometric feature of the user by the camera and send it to the server for authentication. After determining according to the data returned by the server that the authentication succeeds, the controller may control the entrance shielding door to be opened and guide the user to enter the electromagnetic shielding space.

Further, the monitor may further include an ultrasonic sensor configured to determine distances between the user and the entrance shielding door and between the user and the exit shielding door and send the distances to the controller, so that the controller may determine whether to open or close the entrance shielding door or the exit shielding door according to the distances between the user and the entrance shielding door and between the user and the exit shielding door.

For example, the ultrasonic sensor may be located outside the entrance shielding door, and may determine by ultrasonic waves whether there is a user within a specified distance from the entrance shielding door. When it is determined that there is a user outside the entrance shielding door, the server may perform authentication according to a biometric feature of the user collected by the camera. In addition, the ultrasonic sensor may also be located outside the exit shielding door, and may determine by ultrasonic waves whether there is a user exiting the electromagnetic shielding space through the exit shielding door. In other words, there may be a plurality of ultrasonic sensors in the present embodiment, which is not limited here.

Furthermore, there may also be a plurality of cameras that may be located at different positions outside the entrance shielding door. The camera may include a high-speed camera and at least one dome camera. Then, the controller may receive a face image of the user shot by the camera and send the face image to the server for biometric feature recognition, thus authenticating the user approaching the entrance shielding door.

It should be noted that the monitor may include at least one of an ultrasonic sensor, an infrared emission sensor, a high-speed camera, and a dome camera, configured to enable the controller to determine the position of the user. In addition, the entrance shielding door and the exit shielding door may be in a closed state by default, which is not specifically limited in the present application.

In addition, as the reader is located in the electromagnetic shielding space, strength of signals transmitted by the reader varies from place to place in the electromagnetic shielding space. Therefore, in order to reduce the situation that the reader misses reading data, the controller may collect data by the reader after determining that the user is at a first specified position. It may be considered that the reader is less likely to miss reading data when the user carrying the electronic tag is at the first specified position.

For example, the user may be prompted to move to the first specified position according to an identifier on the ground. For example, prompt information "please move to here" may be posted in the electromagnetic shielding space.

In some embodiments, the controller may determine the position of the user in the electromagnetic shielding space by the camera or the ultrasonic sensor, determine a distance between the user and the first specified position, and send prompt information to the user according to the distance. For example, it is assumed that a user A is located in an electromagnetic shielding space B, a first specified position is C, an entrance shielding door is D, and an exit shielding door is E. The user A enters the electromagnetic shielding space B through the entrance shielding door D, and is at a distance of d from the first specified position C. The server may project prompt information "move one step forward to the front right" on the wall by a projector to prompt the user to move to the first specified position C. In some embodiments, an operation key is provided in the electromagnetic shielding space, and when it is detected that the user is operating the operation key, the user is determined to be located at the first specified position. For example, an operable key F is provided in the electromagnetic shielding space C, and the key F is at the first specified position. When it is detected that the user is pressing the key F, the user is determined to be located at the first specified position C.

It should be noted that the steps of the method provided in the embodiments may all be executed by the same device, or the method may be executed by different devices. For example, step S102 and step S104 may be executed by a device 1, and step S106 may be executed by a device 2. For another example, step S102 may be executed by the device 1, and step S104 and step S106 may be executed by the device 2; and so on. Specific embodiments of this specification are described in the foregoing. Other embodiments fall within the scope of the appended claims. In some circumstances, the actions or steps described in the claims may be performed in a sequence different from that in the embodiments and still can achieve a desired result. In addition, the processes depicted in the accompanying drawings do not necessarily require the shown specific sequence or consecutive sequence to achieve the desired result. Multitask processing and parallel processing are also possible or may be advantageous in some implementation manners.

Each of the above described methods and devices may be implemented as software, or hardware, or a combination of software and hardware. For example, a Programmable Logic Device (PLD) (for example, a Field Programmable Gate Array (FPGA)) is an integrated circuit, and logic functions thereof are determined by a user programming device. Designers program by themselves to integrate a digital system into a PLD, without having a chip manufacturer to design and manufacture a dedicated integrated circuit chip. Moreover, at present, the programming is mostly implemented by using logic compiler software, instead of manually manufacturing an integrated circuit chip. The software is similar to a software complier for developing and writing a program, and original codes before compiling also need to be written in a specific programming language, which is referred to as a Hardware Description Language (HDL). There are not just one, but many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL), among which Very-High-Speed Integrated Circuit Hardware Description Language (VHDL) and Verilog are most commonly used now. Those skilled in the art will know that a hardware circuit for implementing the logic method procedure may be easily obtained only by slightly logically programming the method procedure using the above several hardware description languages and programming the method procedure into an integrated circuit.

A controller may be implemented in any suitable manner in the above described devices. For example, the controller may be in the form of a microprocessor or a processor and a computer-readable medium storing computer-readable program codes (for example, software or firmware) executable by the (micro)processor, a logic gate, a switch, an Application Specific Integrated Circuit (ASIC), a programmable logic controller, and an embedded micro-controller. Examples of the controller include, but are not limited to, the following micro-controllers: ARC 625D, Atmel AT91SAM, Microchip PIC18F26K20 and Silicone Labs C8051F320. A memory controller may also be implemented as a part of control logic of a memory. Those skilled in the art also know that, in addition to implementing the controller by using pure computer-readable program codes, the method steps may be logically programmed to enable the controller to implement the same function in the form of a logic gate, a switch, an ASIC (application specific integrated circuit), a programmable logic controller and an embedded microcontroller. Therefore, such a controller may be considered as a hardware component, and apparatuses included therein and configured to implement various functions may also be considered as structures inside the hardware component. Alternatively, further, the apparatuses configured to implement various functions may be considered as both software modules for implementing the method and structures inside the hardware component.

The device, apparatus, module or unit illustrated in the foregoing embodiments can be implemented by a computer chip or an entity, or implemented by a product having a specific function. A typical implementation device is a computer. For example, the computer may be a personal computer, a laptop computer, a cellular phone, a camera phone, a smart phone, a personal digital assistant, a media player, a navigation device, an email device, a game console, a tablet computer, a wearable device, or a combination of any of these devices.

For ease of description, the apparatus is divided into various modules based on functions, and the modules are described separately. In an embodiment, functions of the various modules can also be implemented in one or more pieces of software and/or hardware.

Those skilled in the art should understand that the embodiments of the specification may be provided as a method, a device, or a computer program product. Therefore, the embodiments may be implemented in a form of a complete hardware embodiment, a complete software embodiment, or an embodiment combining software and hardware.

Some embodiment are described with reference to flowcharts and/or block diagrams of the method, device (system) and computer program product. It should be understood that a computer program instruction may be used to implement each process and/or block in the flowcharts and/or block diagrams and combinations of processes and/or blocks in the flowcharts and/or block diagrams. These computer program instructions may be provided to a general-purpose computer, a special-purpose computer, an embedded processor, or a processor of another programmable data processing device to generate a machine, so that the instructions executed by the computer or the processor of another programmable data processing device generate an apparatus configured to implement a specified function in one or more processes in the flowcharts and/or in one or more blocks in the block diagrams.

These computer program instructions may also be stored in a computer-readable memory that may guide a computer or another programmable data processing device to work in a particular manner, such that the instructions stored in the computer-readable memory generate an article of manufacture that includes an instruction apparatus. The instruction apparatus implements a function specified in one or more processes in the flowcharts and/or in one or more blocks in the block diagrams.

These computer program instructions may also be loaded onto a computer or another programmable data processing device, such that a series of operation steps are performed on the computer or another programmable device, thus generating computer-implemented processing. Therefore, the instructions executed on the computer or another programmable device provides steps for implementing a function specified in one or more processes in the flowcharts and/or in one or more blocks in the block diagrams.

In a typical configuration, the computing device includes one or more central processing units (CPUs), an input/output interface, a network interface, and a memory.

The memory may include computer-readable media such as a volatile memory, a Random Access Memory (RAM), and/or non-volatile memory, for example, a Read-Only Memory (ROM) or a flash RAM. The memory is an example of a computer-readable medium.

The computer-readable storage medium may include permanent and non-permanent media as well as movable and non-movable media, and may implement information storage by means of any method or technology. The information may be a computer-readable instruction, a data structure, and a module of a program or other data. Examples of the computer-readable storage medium include, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and may be used to store information accessible to the computing device. According to the definition in this specification, the computer-readable medium does not include transitory media, such as a modulated data signal and a carrier.

It should be further noted that the terms "include," "comprise" or any other variations thereof are intended to cover non-exclusive inclusion, so that a process, method, article, or device including a series of elements not only includes the elements, but also includes other elements not clearly listed, or further includes elements inherent to the process, method, article, or device. In the absence of more limitations, an element defined by "including a/an . . . " does not exclude that the process, method, article, or device including the element further has other identical elements.

Those skilled in the art will understand that the embodiments of the present application can be provided as a method, a system, or a computer program product. Therefore, the present application may be implemented in a form of a complete hardware embodiment, a complete software embodiment, or an embodiment combining software and hardware. Moreover, the present application may be in the form of one or more computer usable storage media including computer-executable program codes (including, but not limited to, a magnetic disk memory, a CD-ROM, an optical memory and the like).

The above described methods may be implemented by instructions executed by a computer, for example, a program module. Generally, the program module includes a routine, a program, an object, an assembly, a data structure, and the like for executing a specific task or implementing a specific abstract data type. The above described methods may also be implemented in distributed computing environments. In the distributed computing environments, a task is executed by remote processing devices connected through a communications network. In the distributed computing environments, the program module may be located in local and remote computer storage media including a storage device.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. A settlement apparatus, comprising:
one or more shielding walls;
a shielding door configured to, when closed, enclose an electromagnetic shielding space with the shielding walls for isolating signals inside and outside the electromagnetic shielding space;
a reader configured to acquire data in an electronic tag in the electromagnetic shielding space;
a controller configured to control opening or closing of the shielding door, control the reader to acquire data, and perform a settlement according to the data;
a monitor configured to monitor a position of a user; and
a position prompting device configured to send out a prompt by emitting light, wherein the controller is configured to control the position prompting device to send out the prompt when the controller determines according to the monitor that the user is located at a first specified position in the electromagnetic shielding space, for prompting the user that the user is located at the first specified position,
wherein the shielding door comprises an entrance shielding door;
the monitor comprises a first sensor configured to monitor a distance between the user outside the entrance shielding door and the entrance shielding door, and
the controller is configured to control the entrance shielding door to be opened when the controller determines according to the first sensor that the distance between the user and the entrance shielding door is within a first specified distance.

2. The apparatus of claim 1, wherein the shielding door comprises an exit shielding door.

3. The apparatus of claim 1, wherein the shielding door is any of a rolling shutter door, a sliding door, a side hung door, and a folding door.

4. The apparatus of claim 2, further comprising:
a collecting device configured to collect a biometric feature of the user outside the entrance shielding door,
wherein the controller is configured to send the collected biometric feature to a server, receive an account identifier that is returned by the server according to the biometric feature and corresponds to the biometric feature, and perform the settlement according to the account identifier.

5. The apparatus of claim 2, wherein the controller is configured to control the exit shielding door to be opened after the settlement according to the data.

6. The apparatus of claim 4, wherein the controller is configured to control the entrance shielding door to be opened when receiving the account identifier that is returned by the server according to the biometric feature and corresponds to the biometric feature.

7. The apparatus of claim 4, wherein the collecting device comprises at least one camera located outside the entrance shielding door for collecting a face image of the user outside the entrance shielding door as the biometric feature of the user.

8. The apparatus of claim 7, wherein the camera comprises a high-speed camera and at least one dome camera, the high-speed camera is located on an outer side of a shielding wall where the entrance shielding door is located, and the at least one dome camera is located on an outer side of the shielding wall at two sides of the entrance shielding door, or on an inner side of the shielding wall.

9. The apparatus of claim 1, wherein the monitor comprises a second sensor configured to monitor a distance between the user outside the exit shielding door and the exit shielding door, and
the controller is configured to control the exit shielding door to be opened after the settlement according to the data, and control the exit shielding door to be closed when the controller determines according to the second sensor that the distance between the user and the exit shielding door is beyond a second specified distance.

10. The apparatus of claim 1, wherein the first sensor comprises at least one ultrasonic sensor located outside the entrance shielding door.

11. The apparatus of claim 9, wherein the second sensor comprises at least one ultrasonic sensor.

12. The apparatus of claim 9, wherein the monitor comprises a third sensor configured to monitor the position of the user in the electromagnetic shielding space, and
the controller is configured to control, when the controller determines according to the third sensor that the user passes through one of the entrance shielding door or the exit shielding door, the one of the entrance shielding door or the exit shielding door through which the user passes to be closed.

13. The apparatus of claim 12, wherein the third sensor comprises at least one infrared emission detector located on a shielding wall.

14. The apparatus of claim 12, wherein the monitor comprises a fourth sensor configured to monitor the position of the user in the electromagnetic shielding space; and
the controller is configured to control the reader to acquire the data in the electronic tag in the electromagnetic shielding space when the controller determines according to the fourth sensor that the user is located at the first specified position in the electromagnetic shielding space.

15. The apparatus of claim 14, wherein the fourth sensor comprises an infrared light strip and a light receptor, the infrared light strip extends from the ground under the entrance shielding door to the ground under the exit shielding door, and the light receptor receives infrared rays emitted by the infrared light strip.

16. The apparatus of claim 1, further comprising an information display device configured to display the data acquired by the reader and/or information produced after the settlement to the user in the electromagnetic shielding space.

17. The apparatus of claim 16, wherein the information display device comprises at least one of a display and a projector.

18. The apparatus of claim 1, wherein the position prompting device includes a luminous light strip.

19. The apparatus of claim 1, wherein the reader comprises a plurality of readers located at second specified positions of various shielding walls.

20. The apparatus of claim 1, wherein the electronic tag is an RFID (radio-frequency identification) tag, and the reader is an RFID reader.

21. A settlement method, implemented on a settlement apparatus comprising a shielding door, one or more shielding walls, a controller, and a reader, the method comprising:
opening the shielding door;
closing the shielding door when it is determined that a user passes through the shielding door, so that the shielding door encloses an electromagnetic shielding space with the shielding walls for isolating signals inside and outside the electromagnetic shielding space; and
monitoring a position of the user, and sending out a prompt by emitting light when the controller determines that the user is located at a first specified position in the electromagnetic shielding space, for prompting the user that the user is located at the first specified position;
acquiring, by the reader, data in an electronic tag in the electromagnetic shielding space, and performing a settlement according to the data,
wherein the shielding door comprises an entrance shielding door, and the opening the shielding door comprises:
monitoring a distance between the user outside the entrance shielding door and the entrance shielding door, and
controlling the entrance shielding door to be opened when the controller determines that the distance between the user and the entrance shielding door is within a first specified distance.

22. The method of claim 21, wherein the opening the shielding door comprises:
collecting a biometric feature of the user;
sending the biometric feature to a server for authentication; and
determining that the authentication succeeds when an account identifier that is returned by the server and corresponds to the biometric feature is received, and opening the entrance shielding door.

23. The method of claim 22, wherein the performing the settlement according to the data comprises:
performing the settlement according to an account corresponding to the received account identifier returned by the server and the data acquired by the reader.

24. The method of claim 21, wherein the opening the shielding door comprises:
opening the shielding door when it is determined that a distance between the user outside the shielding door and the shielding door is within a second specified distance.

25. The method of claim 24, wherein the performing the settlement according to the data comprises:
collecting a biometric feature of the user;
sending the biometric feature to a server for authentication; and
performing the settlement according to the received account identifier that is returned by the server and corresponds to the biometric feature and the data acquired by the reader.

* * * * *